United States Patent
Zhang et al.

(10) Patent No.: US 9,190,222 B1
(45) Date of Patent: Nov. 17, 2015

(54) PRODUCTION OF CARBONACEOUS NANO-FIBROUS MATERIALS WITH ULTRA-HIGH SPECIFIC SURFACE AREA FROM ALKALI (KRAFT) LIGNIN

(71) Applicants: North Carolina Agricultural and Technical State University, Greensboro, NC (US); South Dakota School of Mines and Technology, Rapid City, SD (US)

(72) Inventors: Lifeng Zhang, Greensboro, NC (US); Ajit Kelkar, Greensboro, NC (US); Hao Fong, Rapid City, SD (US); Chuilin Lai, Rapid City, SD (US)

(73) Assignees: North Carolina Agricultural and Technical State University, Greensboro, NC (US); South Dakota School of Mines and Technology, Rapid City, SD (US)

( * ) Notice: Subject to any disclaimer, the term of this patent is extended or adjusted under 35 U.S.C. 154(b) by 206 days.

(21) Appl. No.: 13/830,043

(22) Filed: Mar. 14, 2013

Related U.S. Application Data

(60) Provisional application No. 61/656,813, filed on Jun. 7, 2012.

(51) Int. Cl.
| | |
|---|---|
| *D01F 9/17* | (2006.01) |
| *H01G 11/34* | (2013.01) |
| *D01D 5/00* | (2006.01) |
| *D01F 9/14* | (2006.01) |
| *H01G 11/24* | (2013.01) |
| *H01G 11/36* | (2013.01) |

(52) U.S. Cl.
CPC ............... *H01G 11/34* (2013.01); *D01D 5/003* (2013.01); *D01F 9/14* (2013.01); *H01G 11/24* (2013.01); *H01G 11/36* (2013.01)

(58) Field of Classification Search
CPC ............. D01F 9/14; D01F 9/145; D01F 9/15; D01F 9/155; D01F 9/16; D01F 9/17; D01F 9/18; D01F 9/20; D01F 9/21; D01F 9/22; D01F 9/245; D01F 9/26; D01F 9/28; D01F 9/30
USPC ........ 361/502; 428/398; 264/465; 423/447.2, 423/447.6–447.9
See application file for complete search history.

(56) References Cited

U.S. PATENT DOCUMENTS

| | | | | |
|---|---|---|---|---|
| 3,661,616 A | * | 5/1972 | Miyamichi | 427/270 |
| 2010/0167177 A1 | * | 7/2010 | Yang et al. | 429/532 |
| 2010/0311943 A1 | | 12/2010 | Lallave Rivas et al. | |

OTHER PUBLICATIONS

Babel, K., and Jurewicz, K., "KOH activated lignin based nanostructured carbon exhibiting high hydrogen electrosorption," Carbon. vol. 46 pp. 1948-1956 (2008).

(Continued)

*Primary Examiner* — Daniel C McCracken
(74) *Attorney, Agent, or Firm* — Jenkins, Wilson, Taylor & Hunt, P.A.

(57) ABSTRACT

The present application discloses carbonaceous nano-fibrous materials developed by electrospinning mixtures of alkali lignin with a polymer at varied mass ratios. The present application also discloses processing of the lignin/polymer fibers via progressive heat treatments for stabilization, pre-carbonization and carbonization. The resulting carbon nanofibers maintain a uniform shape and have high specific surface area.

25 Claims, 14 Drawing Sheets

(56) References Cited

OTHER PUBLICATIONS

Braun, J.L., Holtman, K. M. and Kadla, J. F. "Lignin-based carbon fibers: Oxidative thermostabilization of kraft lignin," Carbon. vol. 43 pp. 385-394 (2005).
Chen, X.Y., and Zhou, Q.Q., "The production of porous carbon from calcium lignosulfonate without activation process and the capacitive performance," Electrochimica Acta. vol. 71 pp. 92-99 (2012).
Emmenegger, Ch., Mauron,Ph., Sudan, P., Wenger, P., Hermann, V., Gallay, R. and Zuttel, A. "Investigation of electrochemical double-layer (ECDL) capacitors electrodes based on carbon nanotubes and activated carbon materials," Journal of Power Sources. vol. 124 pp. 321-329 (2003).
Gamby, J., Taberna,P.L., Simon, P., Fauvarque, J.F., Chesneau, M. "Studies and characterisations of various activated carbons used for carbon/carbon supercapacitors," Journal of Power Sources. vol. 101 pp. 109-116 (2001).
Gao, Y., Presser, V., Zhang, L., Niu, J.J., McDonough, J.K., Perez, C.R., Lin, H., Fong, H., Gogotsi, Y., "High power supercapacitor electrodes based on flexible TiC-CDC nanofelts," Journal of Power Sources. vol. 201 pp. 368-375 (2012).
Huang, CW., Hsu, C.-H., Kuo, P.-L., Hsieh, C.-T., Teng, H. "Electrospun polymer nanofibres with small diameters," Nanotechnology. vol. 17 pp. 1558-1563 (2006).
Huang, CW., Chen,S., Lai,C., Reneker,D.H., Qiu, H., Ye,Y., Hou, H., "Mesoporous carbon spheres grafted with carbon nanofibers for high-rate electric double layer capacitors," Carbon. vol. 49 pp. 895-903 (2011).
Kijima,M., Hirukawa,T., Hanawa, F., Hata,T., "Thermal conversion of alkaline lignin and its structured derivatives to porous carbonized materials," Bioresource Technology. vol. 102 pp. 6279-6285 (2011).
Kim, C., Park, S.-H., Cho, J.-I., Lee, D.-Y., Park, T.-J., Lee, W.-J., Yang, K.-S., "Raman spectroscopic evaluation of polyacrylonitrile-based carbon nanofibers prepared by electrospinning," Journal of Raman Spectroscopy. vol. 35 pp. 928-933 (2004).
Kim, B.-J., and Park, S.-J., "A simple method for the preparation of activated carbon fibers coated with graphite nanofibers," Journal of Colloid and Interface Science. vol. 315 pp. 791-794 (2007).
Koombhongse, S., Liu, W., Reneker, D.H., "Flat polymer ribbons and other shapes by electrospinning," Journal of Polymer Science Part B: Polymer Physics. vol. 39 pp. 2598-2606 (2001).
Kubo, S., Uraki, Y., Sano, Y., "Preparation of carbon fibers from softwood lignin by atmospheric acetic acid pulping," Carbon. vol. 36 pp. 1119-1124 (1998).
Kubo, S., and Kadla, J.F., "Lignin-based carbon fibers: effect of synthetic polymer blending on fiber properties," Journal of Polymers and the Environment. vol. 13 pp. 97-105 (2005).
Lallave, M., Bedia, J., Ruiz-Rosas, R., Rordriguez-Mirasol, J., Cordero, T., Otero, J.C., Marquez, M., Barrero, A., Loscertales, I.G., "Filled and hollow carbon nanofibers by coaxial electrospinnning of alcell lignin without binder polymers," Advanced Materials. vol. 19 pp. 4292-4296 (2007).
Li, H.Q., Luo, J.-Y., Zhou, X.-F., Yu, C.-Z., Xia, Y.-Y., "An ordered mesoporous carbon with short pore length and its electrochemical performances in supercapacitor applications," Journal of the Electochemical Society. vol. 154 pp. A731-A736 (2007).
Liu, C.L, Dong, W., Cao, G., Song, J., Liu, L., Yang, Y. "Capacitance limits of activated carbon fiber electrodes in aqueous electrolyte," Journal of the Electrochemical Society. vol. 155 pp. F1-F7 (2008).
Lu, X., Dou, H., Gao, B., Yuan, C., Yang, S., Hao, L., Shen, L., Zhang, X., "A flexible graphene/multiwalled carbon nanotube film as a high performance electrode material for supercapacitors," Electrochimica Acts. vol. 56 pp. 5115-5121 (2011).
Lu, H., Dai, W., Zheng, M., Li, N., Ji, G., Cao, J., "Electrochemical capacitance behaviors of ordered mesoporous carbons with controllable pore sizes," Journal of Power Sources. vol. 209 pp. 243-250 (2012).
Lv,Y., Gan, L., Liu, M., Xiong, W., Xue, Z. Zhu, D., Wright, D.S.,, "A self-template synthesis of hierarchical porous carbon foams based on banana peel for supercapacitor electrodes," Journal of Power Sources. vol. 209 pp. 152-157 (2012).
Moreno-Castilla, C., Dawidziuk, M. B., Carrasco-Marin, F., Zapata-Benabithe, Z., "Surface characteristics and electrochemical capacitances of carbon aerogels obtained from resorcinol and pyrocatechol using boric and oxalic acids as polymerization catalysts," Carbon. vol. 49 pp. 3808-3819 (2011).
Niu, H., Zhang, J., Xie, Z., Wang, X., Lin, T., "Preparation, structure and supercapacitance of bonded carbon nanofiber electrode materials," Carbon. vol. 49 pp. 2380-2388 (2011).
Pech, D., Brunet, M., Durou, H., Huang, P., Mochalin, V., Gogotsi, Y., Taberna, P.-L., Simon, P., "Ultrahigh-power micrometre-sized supercapacitors based on onion-like carbon," Nature Nanotechnology. vol. 5 pp. 651-654 (2010).
Perera, S. D., Patel, B., Nijem, N., Roodenko, K., Seitz, O., Ferraris, J. P., Balkus, K. J., "Vanadium oxide nanowire-carbon nanotube binder-free flexible electrodes for supercapacitors," Advanced Energy Materials. vol. 1 pp. 936-945 (2011).
Presser, V., Zhang, L., Niu, J. J., McDonough, J., Perez, C., Fong, H., & Gogotsi, Y, "Flexible nano-felts of carbide-derived carbon with ultra-high power handling capability," Advanced Energy Materials. vol. 1 pp. 423-430 (2011).
Ra, E. J., Raymundo-Piñero, E., Lee, Y. H., Béguin, F., "High power supercapacitors using polyacrylonitrile-based carbon nanofiber paper," Carbon. vol. 47 pp. 2984-2992 (2009).
Rakhi, R.B., Chen, W., Cha, D., Alshareef, H. N., "Nanostructured Ternary Electrodes for Energy-Storage Applications," Advanced Energy Materials. vol. 2 pp. 381-389 (2012).
Rao, A. M., Richter, E., Bandow, S., Chase, B., Eklund, P. C., Williams, K. A., Fang, S., Subbaswamy, K.R., Menon, M., Thess, A., Smalley, R.E., Dresselhaus, G., Dresselhaus, M.S., "Diameter-Selective Raman Scattering from Vibrational Modes in Carbon Nanotubes," Science. vol. 275 pp. 187-191 (1997).
Raymundo-Pinero, E., Leroux, F., Beguin, F., "A high-performance carbon for supercapacitors obtained by carbonization of a seaweed biopolymer," Advanced Materials. vol. 18 pp. 1877-1882 (2006).
Razaq, A., Nyholm, L., Sjödin, M., Strømme, M., & Mihranyan, A., "Paper-based energy-storage devices comprising carbon fiber-reinforced polypyrrole-cladophora nanocellulose composite electrodes," Advanced Energy Materials. vol. 2 pp. 445-454 (2012).
Tai, Z., Yan, X., Lang, J., Xue, Q., "Enhancement of capacitance performance of flexible carbon nanofiber paper by adding graphene nanosheets," Journal of Power Sources. vol. 199 pp. 373-378 (2012).
Wei, L., Sevilla, M., Fuertes, A. B., Mokaya, R., Yushin, G., "Hydrothermal carbonization of abundant renewable natural organic chemicals for high-performance supercapacitor electrodes," Advanced Energy Materials. vol. 1 pp. 356-361 (2011).
Xing, W., Huang, C. C., Zhuo, S. P., Yuan, X., Wang, G. Q., Hulicova-Jurcakova, D., Yan, Z.F., Lu, G. Q., "Hierarchical porous carbons with high performance for supercapacitor electrodes," Carbon. vol. 47 pp. 1715-1722 (2009).
Yuan, C. Z., Gao, B., Shen, L. F., Yang, S. D., Hao, L., Lu, X. J., Zhang, F., Zhang, L.J., Zhang, X. G. , "Hierarchically structured carbon-based composites: Design, synthesis and their application in electrochemical capacitors," Nanoscale. vol. 3 pp. 529-545 (2011).
Zhang, L.L., and Zhao, X.S., "Carbon-based materials as supercapacitor electrodes," Chemical Society Reviews. vol. 38 pp. 2520-2531 (2009).
Zhou, Z., Lai, C., Zhang, L., Qian, Y., Hou, H., Reneker, D. H., & Fong, H., "Development of carbon nanofibers from aligned electrospun polyacrylonitrile nanofiber bundles and characterization of their microstructural, electrical, and mechanical properties," Polymer. vol. 50 pp. 2999-3006 (2009).
Zhou, Z., Liu, K., Lai, C., Zhang, L., Li, J., Hou, H., Reneker, D.H., Fong, H., "Graphitic carbon nanofibers developed from bundles of aligned electrospun polyacrylonitrile nanofibers containing phosphoric acid," Polymer. vol. 51 pp. 2360-2367 (2010).
Zhu, H., Wang, X., Yang, F., & Yang, X., "Promising carbons for supercapacitors derived from Fungi," Advanced Materials. vol. 23 pp. 2745-2748 (2011).

(56) References Cited

OTHER PUBLICATIONS

Seo, D. K., Jeun, J. P., Kim, H. B., & Kang, P. H., "Preparation and Characterization of the carbon nanofiber mat produced from electrospun PAN/lignin precursors by electron beam irradiation" Rev Adv Mater Sci (2011) 28:31-34.

Dallmeyer, I., Ko, F., & Kadla, J. F., "Electrospinning of Technical Lignins for the Production of Fibrous Networks" J Wood Chem & Tech (2010) 30: 315-329.

Ago et al., "Lignin-Based Electrospun Nanofibers Reinforced with Cellulose Nanocrystals," Biomacromolecules. vol. 13 pp. 918-926 (2012).

Brodin et al., "Oxidative stabilisation of kraft lignin for carbon fibre production," Holzforschung. vol. 66 pp. 141-147 (2012).

Kadla, J.F., and Kubo, S., "Lignin-based polymer blends: analysis of intermolecular interactions in lignin—synthetic polymer blends," Composites: Part A. vol. 35 pp. 395-400 (2004).

Kubo, S., and Kadla, J.F., "The Formation of Strong Intermolecular Interactions in Immiscible Blends of Poly(vinyl alcohol) (PVA) and Lignin," Biomacromolecules. vol. 4 pp. 561-567 (2003).

Ruiz-Rosas et al., "The production of submicron diameter carbon fibers by the electrospinning of lignin," Carbon. vol. 48 pp. 696-705 (2010).

Zhang, "Carbonaceous Nano-fibrous Felts Developed from Alkali Lignin," Slide Presentation, 2011 TAPPI International Conference on Nanotechnology for Renewable Materials. Jun. 6-8, 2011, Washington, D.C. (29 pages)

\* cited by examiner (G)

PRODUCTION OF CARBONACEOUS NANO-FIBROUS MATERIALS WITH ULTRA-HIGH SPECIFIC SURFACE AREA FROM ALKALI (KRAFT) LIGNIN

CROSS REFERENCE TO RELATED APPLICATIONS

This application is based on and claims priority to U.S. Provisional Patent Application Ser. No. 61/656,813, filed Jun. 7, 2012, the disclosure of which is incorporated herein by reference in its entirety.

FIELD

The presently disclosed subject matter generally relates to carbonaceous nano-fibrous materials developed by electrospinning mixtures of alkali lignin and polymer. The presently disclosed subject matter further relates to methods of processing lignin-based precursor nanofibers for stabilization and carbonization. The resulting lignin/polymer nanofibers can lead to carbon nanofibers having uniform shape and high specific surface areas. Such nanofibers have a highly porous structure, and can show highly amorphous/disordered carbon nature; such carbon nanofibers can be used as a sustainable electrode material for high performance supercapacitors.

BACKGROUND

Lignin is a natural macromolecule in the cell wall of vascular plant. It is a naturally existing amorphous biopolymer widely found at an average of 20-30% dry mass and is the second most abundant organic polymer on Earth. Lignin contains hydroxy- and methyoxy-substituted phenylpropane units. It is also a high-volume by-product of wood pulping, which exceeds 15 million tons per year in the United States. Lignin must be removed before wood is turned into high quality paper and the three dimensional network of lignin in wood is generally disrupted under alkaline conditions. Newsprint, brown sack paper, and cardboard each contain certain levels of lignin.

There are a number of types of lignin. Sulfite pulping yields lignosulfonates (lignin sulfonates or sulfite lignins). Alcell lignin comes from the organosolv process and contains very small amounts of inorganic materials. Alkali lignin (also known as Kraft lignin or sulfate lignin) is the dominant lignin by-product from the Kraft pulping process, the predominant wood pulping process today. The Kraft process is the conversion of wood into wood pulp consisting of almost pure cellulose. Wood chips are first treated with a mixture of sodium hydroxide and sodium sulfide, which break the bonds that link lignin to cellulose. Lignin is then isolated from the resulting black liquor with alkali and precipitated using mineral acids. Alkali lignin thus contains high amount of inorganic materials (ashes and salts). Based on the type of wood and the extraction process used, the physical and chemical properties of lignin can differ.

To date lignin has been used mostly as a low-grade fuel, providing heat and power to run mills and associated wood pulping processes. However, there is a growing demand to identify applications with high economic value for the lignin by-product of wood pulping.

Carbon fibers have excellent chemical, electrical, magnetic and mechanical properties and thus have a wide range of potential technical applications. One representative application of carbon fibers is so-called high performance fibers, which generally have superior mechanical properties useful for fiber-reinforced composite materials; and a second example is general purpose carbon fibers, which generally have high specific surface areas. These high surface area carbon fibers typically have applications that do not rely on their mechanical properties. Such applications include, but are not limited to, catalysis, adsorption/separation, energy storage and conversion, gas storage, nanoelectronics and other application requiring materials with a high specific surface area.

Preparation of carbon fibers from various types of lignin has been suggested; but, a number of problems, including but not limited to low mechanical properties of the resulting carbon fibers, have prevented their commercial use in reinforcement and/or composites applications. In one approach, carbon fibers have been generated using melt extrusion. The diameter of the resulting carbon fibers generally ranges from 30-80 microns and carbon fibers have not been successfully prepared at smaller diameters because of limitations in the melt extrusion process.

The rapidly developing technology of "electrospinning" provides a mechanism to produce nano-scaled polymer fibers (generally with diameters <1,000 nm). Electrospinning low-cost and renewable alkali lignin into carbonaceous nanofibrous materials would provide a novel method of manufacture for a product with many applications.

Energy storage and conversion has become an important global subject, including research efforts on fuel cells, batteries and capacitors. Electrochemical capacitors are important electrical energy storage devices. New type of electrochemical capacitors that have specific capacitance values up to 10,000 times of electrolytic capacitors have been developed rapidly in recent years. In general, two energy storage modes are present in these super high capacitance capacitors: electric double layer capacitors (also referred to as supercapacitors or ultracapacitors) and pseudocapacitors. Supercapacitors store and release electrical energy by ion absorption and desorption on electrode surface and their capacitance is generally proportional to the specific surface area of their electrodes. Pseudocapacitors achieve energy storage and release by charge transfer at electrode surface between electrode and electrolyte via reversible redox or Faradaic reactions.

Supercapacitors have demonstrated application in memory backup system, auxiliary power unit, instantaneous power compensation, and energy storage. Electrode material is one factor that influences the efficiency and practicality of supercapacitors. To date, a variety of carbon materials have been investigated as electrode materials for supercapacitors such as traditional activated carbon, carbon nanotubes, carbon nanofibers, carbon aerogels, carbide-derived carbon, and composite materials containing vanadium oxide and graphene nanosheets. Among current electrode materials, activated carbon is one that is widely used. However, the process of activating carbon is costly and energy-consuming. In addition, preparation of a free-standing electrode from activated carbon generally requires additional organic binder, which can degrade the overall performance of the electrode.

The generation of free-standing carbon electrode materials with high specific surface area from renewable carbonaceous sources remains a challenge for high performance supercapacitors.

SUMMARY

The present application discloses carbonaceous nano-fibrous materials developed by electrospinning mixtures of alkali lignin and a polymer at varied mass ratios and subsequently heating the acquired precursor nanofibers according to a progressive heat treatment as disclosed herein. In some embodiments, the spin dope is an aqueous solution comprising alkali lignin and a water soluble polymer. The present application also discloses processing conditions and procedures of lignin-based precursor nanofibers for stabilization and carbonization. The resulting carbon fibers can have diameters from 100 to 1000 nm, maintain a uniform shape, and have high specific surface area.

The present application also discloses in some embodiments a sustainable electrode material for high performance supercapacitors developed by electrospinning an aqueous solution comprising alkali lignin and a polymer, for example, a water soluble polymer, such as poly (vinyl alcohol), at varied mass ratios, such as up to 70 wt % alkali lignin, followed by thermal stabilization and carbonization. The resulting lignin-based carbon nanofiber mats are mechanically flexible and demonstrate good performance when used as binder-free electrodes in supercapacitors.

In some aspects, the present application discloses a method for the manufacture of carbon nanofibers comprising providing intermediate nanofibers stabilized by heating in an oxygen-containing atmosphere; and pre-carbonization heating comprising providing the stabilized intermediate nanofibers in an inert atmosphere and heating the inert atmosphere up to at least about 400° C. at a heating rate of up to about 2° C. per minute yielding pre-carbonized nanofibers.

In some aspects, the present application discloses a method for preparing carbon nanofibers comprising electrospinning a mixture comprising alkali lignin and a polymer.

In some aspects, the present application discloses a method for preparing carbon nanofibers comprising (a) electrospinning a mixture of alkali lignin and a polymer; (b) providing the electrospun alkali lignin/polymer nanofibers in an oxygen-containing atmosphere and progressive stabilization heating of the oxygen-containing atmosphere from a first stabilization temperature of at least about 100° C. to a final stabilization temperature of at least about 200° C. at a heating rate of no more than 1° C. per minute to yield stabilized nanofibers; (c) providing the stabilized nanofibers in an inert atmosphere and heating the inert atmosphere up to a pre-carbonization temperature of at least about 400° C. at a heating rate of no more than about 0.2° C. per minute and holding at said pre-carbonization temperature for a sufficient time to increase crosslinking in the nanofibers to yield pre-carbonized nanofibers; and (d) providing the pre-carbonized nanofibers in an inert atmosphere and heating the inert atmosphere up to a carbonization temperature of at least about 700° C. at a heating rate of no more than about 10° C. per minute and holding at said carbonization temperature for a sufficient time to remove most of the non-carbon impurities in said nanofibers. In some embodiments, the rate of heating in (b) is between about 0.05° C./min and about 1° C./min; the rate of heating in (c) is no more than about 0.1° C./min and the pre-carbonization temperature is held for at least about 30 minutes; and the carbonization temperature is held for at least about 30 minutes.

In some embodiments, a method further comprises carbonization heating between about 700° C. and about 2200° C., for a sufficient time to yield carbon nanofibers; in one variation, the carbonization heating is in a vacuum and in another variation the carbonization heating is in an inert atmosphere. In some embodiments, the pre-carbonization heating comprises heating from at least about 150° C. to between about 400° C. and about 600° C. at a heating rate of at least about 1° C. and holding at a pre-carbonization temperature between about 400° C. and about 600° C. for a sufficient time to increase the crosslinking of the nanofibers and/or to begin to remove non-carbon elements from the nanofibers. In some embodiments, the pre-carbonization temperature is between about 450° C. and about 550° C.

In some embodiments, the heating rate is up to about 0.5° C./min. In some embodiments, the heating rate is up to about 0.1° C./min. In some embodiments, the heating rate is up to 0.08° C./min. In some embodiments, the heating rate is up to 0.05° C./min. In some embodiments, a sufficient time for carbonization heating to yield carbon nanofibers is at least about 30 minutes; in another embodiment, a sufficient time is at least about 1 hour. In some embodiments, a sufficient time to increase the crosslinking of the nanofibers and/or to begin to remove non-carbon elements from the nanofibers is at least about 30 minutes, in another embodiment, at least about 1 hour; and in another embodiment, at least about 2 hours.

In some embodiments, the stabilized intermediate nanofibers are prepared by electrospinning a mixture comprising alkali lignin and a polymer. In some embodiments, the electrospinning is solution electrospinning. In some embodiments, the electrospinning is melt electrospinning.

In some embodiments, the polymer is soluble in an aqueous solvent; alternately the mixture comprising alkali lignin and a polymer further comprises water and the polymer is soluble in the mixture. In some embodiments, the polymer is poly(vinyl alcohol) (PVA). In some embodiments, the mixture of alkali lignin and PVA contains at least about 50 wt % alkali lignin; in some embodiments, the mixture contains at least about 70 wt % alkali lignin. In some embodiments, the ratio of alkali lignin to poly(vinyl alcohol) (lignin/PVA) is between about 50/50 and about 85/15. In some embodiments, the alkali lignin/PVA ratio is at least about 70/30. In some embodiments, the polymer is soluble in a non-aqueous solvent. In some embodiments, the polymer is polyacrylonitrile.

In some embodiments, heating of electrospun alkali lignin/polymer nanofibers in an oxygen-containing atmosphere to a stabilization temperature of at least about 100° C. at a heating rate of no more than 2.0° C. per minute yields stabilized nanofibers. In some embodiments, heating stabilized nanofibers in an inert atmosphere to a pre-carbonization temperature of at least about 400° C. at a heating rate of no more than about 0.5° C. per minute yields pre-carbonized nanofibers.

In some embodiments, the stabilization heating comprises (a) providing electrospun alkali lignin/polymer nanofibers in an oxygen-containing atmosphere and heating the oxygen-containing atmosphere to a first stabilization temperature of at least about 100° C. at a heating rate of no more than 2.0° C. per minute; (b) heating from the first stabilization temperature to a second stabilization temperature of at least about 160° C. at a heating rate of no more than about 1.0° C. per minute; (c) heating from the second stabilization temperature to a third stabilization temperature of at least about 180° C. at a heating rate of no more than about 1.0° C. per minute; and (d) heating from the third stabilization temperature to a fourth stabilization temperature of at least about 200° C. at a heating rate of no more than about 1.0° C. per minute; wherein the stabilization heating yields stabilized nanofibers.

In some embodiments providing the stabilized nanofibers in an inert atmosphere and heating the inert atmosphere to a pre-carbonization temperature of at least about 400° C. at a heating rate of no more than 0.5° C. per minute yields pre-carbonized nanofibers.

In other embodiments, the second stabilization temperature is maintained for at least about 8 hours; the third stabilization temperature is maintained for at least about 12 hours; and the fourth stabilization temperature is maintained for at least about 2 hours.

In some embodiments, heating the carbon nanofibers at a sufficient temperature and for a sufficient time provides activated carbon nanofibers.

In yet another aspect, the present application discloses carbon nanofibers prepared according to the methods disclosed herein.

In some embodiments, the carbon nanofibers have (a) a specific surface area of at least about 550 $m^2$/g as measured by BET isotherm and/or (b) a total pore volume of at least about 0.3 $cm^3$/g as measured by $N_2$ gas sorption and/or (c) an average pore size no more than about 4 nm as measured by $N_2$ gas sorption. In another embodiment, the carbon nanofibers have (a) a specific surface area of at least about 250 $m^2$/g as measured by BET isotherm and/or (b) a total pore volume of at least about 0.14 $cm^3$/g as measured by $N_2$ gas sorption and/or (c) an average pore size no more than about 4 nm as measured by $N_2$ gas sorption.

In some embodiments, the carbon nanofibers have a surface area of from about 250 $m^2$/g to about 750 $m^2$/g, a peak pore volume greater than about 0.04 $cm^3$/nm/g for pores having a diameter of less than about 5 nm, and an average pore size of no more than about 4 nm. In other embodiments, the carbon nanofibers have a surface area of from about 250 $m^2$/g to about 750 $m^2$/g, a peak pore volume greater than about 0.03 $cm^3$/nm/g for pores having a diameter of less than about 2 nm, and an average pore size of no more than about 4 nm.

In yet a further aspect, the present application discloses an electric double layer capacitor comprising a carbon nanofiber prepared according to the methods disclosed herein.

In some embodiments, the electric double layer capacitor carbon nanofibers have a specific capacitance of at least 60 F/g at a current density of 400 mA/g.

These and other objects and aspects of the present application will become apparent to those skilled in the art after a reading of the following description of the disclosure when considered with the drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A better understanding of the features and advantages of the present application will be obtained by reference to the following detailed description that sets forth illustrative embodiments, in which the principles of the application are utilized, and the accompanying drawings of which:

FIG. 2A is an SEM of lignin/PVA nanofibers prepared from an 8% (lignin/PVA) in $H_2O$ solution, wherein the nanofibers generally comprise ~150 nm fibers with 500-700 nm beads;

FIG. 2B is an SEM of lignin/PVA nanofibers prepared from a 10% (lignin/PVA) in $H_2O$ solution, wherein the nanofibers generally comprise ~250 nm fibers with some larger fibers up to 400 nm;

FIG. 2C is an SEM of lignin/PVA nanofibers prepared from a 12% (lignin/PVA) in $H_2O$ solution, wherein the nanofibers generally comprise ~300 nm fibers with up to 1.5 μm ribbons;

FIG. 2D is an SEM of PVA nanofibers prepared from a 12% PVA in $H_2O$ solution wherein the nanofibers generally comprise fibers of 150-250 nm and of 400-500 nm;

FIG. 2E is an SEM of lignin/PVA nanofibers prepared from a 10% 50/50 lignin/PVA $H_2O$ solution wherein the nanofibers generally comprise ~250 nm fibers;

FIG. 2F is an SEM of lignin/PVA nanofibers prepared from an 11% 30/70 lignin/PVA in $H_2O$ solution wherein the nanofibers generally comprise ~350 nm fibers; and FIG. 2G is an SEM of lignin/PVA nanofibers prepared from a 12% 70/30 lignin/PVA in $H_2O$ solution wherein the nanofibers generally comprise ~370 nm fibers with ~700 nm ribbons.

FIG. 4A is a TEM of carbon nanofibers derived from PVA;

FIG. 4B is a TEM of carbon nanofibers prepared from lignin/PVA mass ratio 30/70;

FIG. 4C is a TEM of carbon nanofibers prepared from lignin/PVA mass ratio 50/50; and FIG. 4D is a TEM of carbon nanofibers prepared from lignin/PVA mass ratio 70/30. The inset in FIG. 4D depicts the electron diffraction pattern of the sample.

FIG. 6A is an SEM of ~250 nm carbon fibers prepared from a 13% PVA in $H_2O$ solution;

FIG. 6B is an SEM of ~320 nm carbon fibers prepared from an 11% 30/70 lignin/PVA in $H_2O$ solution;

FIG. 6C is an SEM of ~220 nm carbon fibers prepared from a 10% 50/50 lignin/PVA in $H_2O$ solution; and FIG. 6D is an SEM of carbon fibers of ~280 nm diameter with ~650 nm ribbons prepared from a 12% 70/30 lignin/PVA in $H_2O$ solution.

Figure 1:
FIG. 1 is an image of final carbon nanofiber mats (or carbon nano-felt) developed from electrospun alkali lignin/PVA nanofiber mat at mass ratio of 70/30.

It will be understood that the drawings are for the purpose of describing embodiments of the present application and are not intended to limit the inventions thereto.

DETAILED DESCRIPTION

The use of the terms "a" and "an" and "the" and similar referents in the context of describing the presently disclosed subject matter (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate the invention and does not pose a limitation on the scope of the invention unless otherwise claimed. No language in the specification should be construed as indicating any non-claimed element as essential to the practice of the presently disclosed subject matter.

In accordance with the present application and as used herein, the following terms are defined with the following meanings, unless explicitly stated otherwise.

As used herein, the phrase "alkali lignin" generally denotes lignin removed from biomass and isolated as a by-product of the Kraft pulping process. Typically, alkali lignin is isolated by treating black liquor from the process with acid. There are currently a number of commercial suppliers of alkali lignin (CAS 8068-05-1).

Alkali lignin originating in a wide variety of sources can be used in the methods disclosed herein. Non-limiting examples of lignin sources include but are not limited to tobacco, corn, corn stovers, corn residues, cornhusks, sugarcane bagasse, castor oil plant, rapeseed plant, soybean plant, cereal straw, rice straw, grain processing by-products, bamboo, bamboo pulp, bamboo sawdust, and energy grasses, such as switchgrass, miscanthus, and reed canary grass. Processing these lignin sources via the Kraft process could yield alkali lignin, which can be employed in the methods disclosed herein. Typically, the source of lignin used in the Kraft pulping process is wood chips.

Still further, various paper products can be used as sources of lignin, including but not limited to pre-consumer or post-consumer newsprint, brown sack paper and paperboard.

As used herein, the term "polymer" refers to macromolecules comprising repeating structural units. Typically, the polymer can be converted to solid carbon upon heat treatment as disclosed herein. Generally, the polymer is soluble in a common solvent with alkali lignin or is compatible with alkali lignin in a melt.

As used herein, "spin dope" refers to a fluid to be electrospun as disclosed herein. Generally, a spin dope comprises a solvent, alkali lignin and a polymer; such a fluid is used in solution electrospinning. Polymers such as poly(vinyl alcohol) (PVA) and polyacrylonitrile (PAN) can both be used in solution electrospinning. In some examples, the spin dope does not include a solvent. A mixture which comprises alkali lignin and a polymer and does not contain a solvent is used in a process referred to as "melt electrospinning." PVA is an example of a polymer that can be used in combination with alkali lignin in melt electrospinning. If used in melt electrospinning the decomposition of PAN at about 300° C. needs to be considered and monitored.

The phrase "alkali lignin/polymer nanofiber" refers to the nanofibrous product resulting from electrospinning the combination of alkali lignin and a polymer. In one variation, the polymer is soluble in aqueous solutions. One example of such a polymer is poly(vinyl alcohol) (PVA). The polymer can also be soluble in non-aqueous solvents, such as for example polyacrylonitrile (PAN).

As used herein "inert atmosphere" refers generally to an inert gas, such as nitrogen, argon, helium, neon, or the like, or a combination thereof, or may refer to any other gas, as long as the gas is not chemically reactive with the electrospun fibers or the nanofibers described herein.

As used herein, "furnace" refers to a heating unit that can withstand and maintain the temperatures disclosed herein and can maintain the atmosphere, oxygen-containing or inert, or vacuum in the relevant steps disclosed herein; generally the heating rate and a targeted temperature can be programmed into the furnace. As used, furnace includes, but is not limited to, a tube furnace and a box furnace. For each of the heating steps disclosed herein, including but not limited to heating rates and targeted heating temperatures, the rate/temperature is what is programmed into the furnace. Thus, the disclosed rate is the rate at which the heating rate of the furnace is set and the targeted heating temperature is the temperature at which the furnace is set. The nanofibers disclosed herein may or may not themselves be at the temperature described, but the temperature of the nanofibers is not the defined variable.

As used herein, the phrase "heat stabilization" or "heat stabilized" refers to progressive heat treatment of the alkali lignin/polymer nanofibers from about 100° C. to about 300° C., typically in the range of about 180° to about 220° C., with a heating rate of up to about 2° C./min, in an oxygen-containing atmosphere (e.g. air). Without being bound by theory, the heat stabilization is generally thought to crosslink the molecules so that they can survive higher temperature carbonization without melting and/or decomposing.

As used herein, "stabilized nanofibers" refers to alkali lignin/polymer nanofibers after the heat stabilization step described above.

As used herein, the term "pre-carbonization" or "pre-carbonized" refers to heat treatment of the stabilized nanofibers described above, wherein the pre-carbonization temperature is from about 400° C. to about 600° C., typically about 450° C. to about 550° C., wherein the pre-carbonization temperature is reached via a heating rate of up to about 2° C./min, generally in an inert atmosphere (e.g. argon). Without being bound by theory, pre-carbonization heating is thought to increase crosslinking and start to remove non-carbon elements and impurities from the nanofibers.

As used herein, "pre-carbon nanofibers" refers to the stabilized nanofibers described above that have been further treated according to the pre-carbonization step described above.

As used herein, the term "carbonization" or "carbonized" refers to heat treatment of the pre-carbon nanofibers described above, wherein carbonization temperature is from about 700° C. to about 1800° C., alternately from about 800° C. to about 1600° C., typically from about 900° to about 1200° C., wherein the carbonization temperature is reached via a heating rate of up to about 10° C./min, generally in an inert atmosphere (e.g. argon) or under vacuum. Without being bound by theory, carbonization heating is thought to remove some, most or all of the elements other than carbon from the nanofibers. When the carbonization temperature is raised to at least about 2200° C., such as about 2800° C., graphitization of the product is observed.

As used herein, "carbon nanofibers" refers to carbon fibers with diameters from about 100 nm to about 1000 nm. The carbon nanofibers described herein result from carbonization heat treatment of alkali lignin/polymer nanofibers, wherein the carbon nanofibers maintain a uniform shape and have high specific surface area.

As used herein, "carbon nano-felt" or "carbon nano-mat" refers to a felt, mat or membrane that is composed of carbon nanofibers prepared according to the methods disclosed herein.

The present application discloses carbonaceous nano-fibrous materials developed by electrospinning mixtures of alkali lignin and a polymer at particular mass ratios and heating the resulting electrospun nanofibers according to a progressive heat treatment as disclosed herein. The present application discloses carbon nanofibers developed by electrospinning aqueous mixtures of alkali lignin with a carbon precursor polymer (e.g. poly(vinyl alcohol)). The present application also discloses processing conditions and procedures of the lignin/polymer fibers via progressive heat treatments for stabilization and carbonization. By way of example and not limitation, the resulting carbon fibers have diameters from about 100 nm to about 1000 nm, maintain a uniform shape and have high specific surface area.

In one embodiment, the spin dope, that is mixture from which the nanofibers are electrospun comprises alkali lignin, a polymer and a solvent that dissolves the lignin and polymer. In one variation, the alkali lignin is combined with a polymer selected from the group consisting of poly(vinyl alcohol) and polyacrylonitrile. In one embodiment, the polymer is a water soluble polymer, such as poly(vinyl alcohol). In one embodiment, the solvent is water; in another embodiment, the solvent is water in combination with another solvent, such as acetone, N,N-dimethylformamide ("DMF") and/or an alcohol, for example, ethanol. When a solvent mixture is used, the ratio of solvents can vary; generally the solvent contains enough water to achieve dissolution of the alkali lignin. In one embodiment, the polymer is soluble in non-aqueous solvents. In one variation, the alkali lignin is combined with a polymer selected from the group consisting of polyacrylonitrile, rayon and pitch. In another variation, the polymer is polyacrylonitrile.

In another embodiment, the spin dope comprises alkali lignin and a polymer and does not comprise a solvent. In one variation the alkali lignin is combined with a polymer selected from the group consisting of poly(vinyl alcohol), poly(ethylene oxide) (PEO), and rayon. In another variation, the polymer is poly(ethylene oxide); in yet another variation, the polymer is poly(vinyl alcohol).

As disclosed herein, the ratio of alkali lignin to polymer by weight ("alkali lignin/polymer") can vary. In one variation, the ratio has at least 90 wt % alkali lignin or at least about 80 wt. % alkali lignin. Alternately, the ratio is 70/30 lignin/polymer or 60/40 lignin/polymer. In another variation, the ratio is 50/50 alkali lignin/polymer or 40/60 lignin/polymer, or even 30/70 lignin/polymer. Usually the ratio comprises at least 50% alkali lignin, for example a ratio of 55/45, 60/40, 65/35, 70/30, 75/25, 80/20, 85/15, 90/10 or 95/5 lignin/polymer. Typically, the weight ratio is at least about 70/30 alkali lignin to polymer.

In one embodiment, the spin dope contains water as the solvent and up to about 20% alkali lignin/poly(vinyl alcohol) in a ratio comprising at least about 50 weight % alkali lignin. In one variation, the ratio comprises at least about 60 wt % alkali lignin or at least about 70% alkali lignin.

As disclosed herein, the concentration of the alkali lignin/polymer mixture in solution can vary. In one variation, the electrospinning solution contains about 8% alkali lignin/polymer. In another variation, the electrospinning solution contains about 10% alkali lignin/polymer or about 11% or about 12% alkali lignin/polymer. In yet another variation, the electrospinning solution contains about 13% or about 14% or about 15% alkali lignin/polymer by weight. In another variation, the electrospinning solution contains up to about 20% alkali lignin/polymer by weight. In one variation, the solvent is water. In another variation, the solvent is water in combination with one or more of acetone, DMF or an alcohol, such as ethanol.

The present application also discloses processing conditions and procedures of the lignin/polymer nanofibers via progressive heat treatments for stabilization and carbonization. In the first step of heating or "stabilization heating", the electrospun alkali lignin/polymer nanofibers are heated in an oxygen-containing atmosphere, generally air, in a step-wise fashion up to at least about 100° C., alternately up to about 150° C. or about 180° C. or about 200° C. or about 250° C. This stabilization heating typically occurs at rates ranging from about 0.01° C. per minute up to about 5° C. per minute, generally between about 0.02° C. per minute to about 2° C. per minute, alternately between about 0.05° C. per minute to about 0.1° C. per minute. In one variation, the heating rate is about 1° C. per minute.

In one embodiment of the stabilization heating process, the heating rate from room temperature is no more than about 2° C./minute or alternatively from about 0.5° C./min to about 2° C./min to a first intermediate stabilization temperature of at least about 75° C., alternately to a temperature of at least about 95° C. or at least about 100° C.

Generally, the stabilization steps described below include heating at a decreased heating rate. The decreased heating rate is typically no more than about 2° C. per minute. Alternately, the rate is from about 0.02° C. per minute to about 2° C. per minute, or at a rate of between about 0.1° C. and about 1° C. per minute, or between about 0.2° C. and about 0.5° C. per minute. In another alternative, the heating rate is between about 0.02° C./min and about 0.1° C./min, alternately between about 0.02° C./min and about 0.08° C./min or between about 0.04° C./min and about 0.06° C./min. In yet another alternative the heating rate is between about 0.02° C. per minute and about 0.5° C. per minute or between about 0.05° C. per minute and about 0.1° C. per minute or between about 0.05° C. and about 0.07° C. per minute. In one variation, the heating rate is no more than about 0.5° C. per minute or no more than about 0.1° C. per minute or no more than about 0.05° C. per minute. In another variation, the heating rate is about 0.05° C. per minute.

The sample is heated at the above-described decreased heating rate from a first intermediate stabilization temperature to a second intermediate stabilization temperature of at least about 160° C. or at least about 175° C. or at least about 180° C. or at least about 200° C. Usually, the sample is held at the second intermediate stabilization temperature for at least about 8 hours or at least about 10 hrs, generally at least about 12 hours. In one variation, the sample is held at the second intermediate stabilization temperature for at least about 14 hours or at least about 16 hours or at least about 18 hours.

The sample is then heated at the decreased heating rate disclosed above to a third intermediate stabilization temperature of at least about 180° C. or at least about 200° C. or at least about 220° C. or at least about 240° C. Usually the sample is held at the third intermediate stabilization temperature for at least about 12 hours, at least about 18 hours, or at least about 24 hours, generally at least about 30 hours. In one variation, the sample is held at the third intermediate stabilization temperature for at least about 36 hours or at least about 40 hours.

The sample is then heated at the decreased heating rate disclosed above to a fourth intermediate stabilization temperature of at least about 200° C. or at least about 220° C. or at least about 240° C. Usually the sample is held at the fourth intermediate stabilization temperature for at least about 2 hours, at least about 4 hours, generally at least about 6 hours. In one variation, the sample is held at the fourth intermediate stabilization temperature for at least about 8 hours or at least about 10 hours. The rate of heating and the targeted stabilization temperature is determined by the resulting stabilization of the alkali lignin/polymer nanofibers, targeted so that the fibers survive higher temperature heat treatments described below without melting, decomposing and/or changing shape.

Following the stabilization heating in an oxygen-containing atmosphere, and in anticipation of carbonization, the atmosphere in the furnace is typically purged with an inert gas, such as argon, for the pre-carbonization heating step. Pre-carbonization heating generally refers to heating the alkali lignin/polymer intermediate nanofibers (see FIG. 5) up to at least about 400° C. or up to at least about 450° C. In one variation, the heating is up to at least about 500° C. or at least about 550° C. In yet another variation, the heating is up to at least about 600° C. or up to at least about 650° C. Generally, the pre-carbonization heating of the alkali lignin/polymer intermediate nanofibers, which have been heat stabilized as described above, is in the range from about 400° C. to about 600° C., typically in the range of about 450° C. to about 550° C. Usually, the per-carbonization heating rate is up to about 1° C. per minute, alternately up to about 0.1° C. per minute. In one variation, the pre-carbonization heating rate ranges from about 0.01° C. per minute up to about 5° C. per minute, generally the heating rate is between about 0.02° C. per minute and about 2° C. per minute, or at a rate of between about 0.1° C. and about 1° C. per minute, or between about 0.2° C. and about 0.5° C. per minute. Alternately the heating rate is between about 0.02° C. per minute and about 0.5° C. per minute or between about 0.05° C. per minute and about 0.1° C. per minute or between about 0.05° C. and about 0.07° C. per minute. In one variation, the heating rate is no more than about 0.5° C. per minute or no more than about 0.1° C. per minute or no more than about 0.05° C. per minute. In one variation, the heating rate is about 0.05° C. per minute. In one embodiment, the temperature is held at the upper limit (e.g. between about 400° C. and 600° C.) for at least about 30 minutes, for example for at least about 1 hour. Typically, the temperature is held at the pre-carbonization temperature under an inert atmosphere for a sufficient time to increase crosslinking in the intermediate nanofibers and start to remove non-carbon elements and impurities from the nanofibers.

Following the pre-carbonization heating, the pre-carbon nanofibers are carbonized in an inert atmosphere via heating to at least about 800° C. or at least about 900° C. In one variation, the pre-carbon nanofibers are heated to at least about 1000° C. or at least about 1200° C. In another variation, the nanofibers are heated to at least about 1400° C. or at least about 1600° C. Generally, the heating rate of the carbonization process is up to about 15° C. per minute, up to about 10° C. per minute, up to about 5° C. per minute, or up to about 2° C. per minute. Typically, the carbonization process involves heating from about 800° C. to about 1600° C. Alternately, the carbonization process involves heating from about 900° C. to about 1000° C. In another variation, carbonization comprises heating from about 900° C. to about 1200° C., at a heating rate up to 5° C./min generally in an inert atmosphere (e.g. argon). The nanofibers are heated under such conditions necessary to reduce the amount of elements other than carbon in the nanofibers. In some embodiments, a sufficient time to yield carbon nanofibers is at least about 30 minutes. Generally, the upper limit of the carbonization temperature is less than about 2200° C. When the carbonization temperature is raised to at least 2200° C., such as 2800° C., graphitization of the product is observed.

Generally, the diameter of the carbon nanofibers resulting from the methods disclosed herein are dependent on a number of experimental conditions, such as, but not limited to, the spin dope properties, the electrospinning conditions (such as voltage, flow rate, and distance between the spinneret and collector).

In one embodiment, the average diameter of the carbon nanofibers is no more than about 900 nm; in another embodiment, the average diameter is no more than about 800 nm, no more than about 700 nm, no more than about 600 nm, no more than about 500 nm, no more than about 400 nm, no more than about 300 nm, no more than about 200 nm or no more than about 100 nm. Typically, the average diameter of the carbon nanofibers is between about 100 nm and about 800 nm. In one alternative, the average diameter of the carbon nanofibers is between about 200 nm and about 700 nm. In one embodiment, the average diameter is between about 100 nm and about 300 nm or between about 200 nm and about 400 nm.

The progressive heating disclosed herein leads to formation of a uniform carbon nanofiber composition. In one embodiment, a majority of the carbon nanofibers have diameters within a range of about 100 nm of each other. In one embodiment, at least about 50%, at least about 60%, at least about 70%, at least about 80%, at least about 90% or at least about 95% of the carbon nanofibers of the composition, having an average diameter between about 100 nm and about 1000 nm, have diameters within about 100 nm of each other. In one variation, at least about 50% of the carbon nanofibers have diameters within about 100 nm of an average diameter that ranges from 100 nm and 800 nm; in another variation, 60% of the carbon nanofibers have diameters within about 100 nm of an average diameter that ranges from 100 nm to 400 nm. In yet another embodiment, the diameters of at least about 50%, at least about 60%, at least about 70%, at least about 80%, at least about 90% or at least about 95% of the carbon nanofibers of the composition are within about 50 nm of each other. In one variation, at least about 50% of the carbon nanofibers have diameters within about 50 nm of an average diameter that ranges from 100 nm and 800 nm; in another variation, 60% of the carbon nanofibers have diameters within about 50 nm of an average diameter that ranges from 100 nm to 400 nm. In still another embodiment, at least about 50%, at least about 60%, at least about 70%, at least about 80%, at least about 90% or at least about 95% of the carbon nanofibers will have diameters in a range of about 400 nm to about 600 nm. In another embodiment, at least about 50%, at least about 60%, at least about 70%, at least about 80%, at least about 90% or at least about 95% of the carbon nanofibers will have diameters in a range of about 100 nm to about 300 nm.

The carbon fibers prepared from alkali lignin and a polymer according to the methods disclosed herein generally have average diameters between 100 and 1000 nm. Usually, the nanofibers have average diameters of no more than about 1000 nm or nor more than about 900 nm. Alternately, the nanofibers have average diameters of no more than about 800 nm or no more than about 700 nm. In one variation, the nanofibers have average diameters of no more than about 600 nm or no more than about 500 nm. In yet another variation, the nanofibers have average diameters of no more than about 400 nm or no more than about 300 nm. In another variation, the nanofibers have average diameters of no more than about 200 nm. In one embodiment, the average nanofiber diameter is no more than about 100 nm or no more than about 150 nm. Generally, the nanofibers prepared according to the methods disclosed herein range from about 100 nm to about 500 nm. Alternately, the nanofibers prepared according to the methods disclosed herein range from about 200 nm to about 400 nm, such as 200 nm to 300 nm.

Nano-fibrous mats comprising porous carbon nanofibers derived from alkali lignin have potential applications that do not rely on mechanical properties but instead tend to rely on large specific surface area. The use of low-cost and renewable lignin as the precursor to develop carbonaceous nanofibrous mats/felts/membranes can have a great impact on these applications. The carbon nano-felts disclosed herein generally have large pore volumes and ultra-high specific surface area and have applications including but not limited to catalyst support, electrode materials for supercapacitor, fuel cell and dye-sensitive solar cells, and hydrogen storage materials.

Carbon nano-felts comprising nanofibers prepared from alkali lignin and a polymer according to the methods disclosed herein have a BET specific surface area of up to at least about 1000 m$^2$/g. Alternately, the carbon nano-felt can have a surface area of up to at least about 800 m$^2$/g, up to at least about 600 m$^2$/g, up to at least about 500 m$^2$/g, or up to at least about 400 m$^2$/g. Generally, the surface area of a carbon nano-felt of the present application is at least about 10 m$^2$/g or at least about 20 m$^2$/g. Alternately, the surface area is at least about 50 m$^2$/g or at least about 100 m$^2$/g. In another embodiment, the surface area is at least about 150 m$^2$/g or 200 m$^2$/g. In yet another embodiment, the surface area is at least about 250 m$^2$/g or at least about 300 m$^2$/g. Generally, the surface area ranges from about 10 m$^2$/g to about 1000 m$^2$/g. Alternately, the surface area ranges from about 50 m$^2$/g to about 800 m$^2$/g, about 100 m$^2$/g to about 600 m$^2$/g, about 150 m$^2$/g to about 500 m$^2$/g. Alternately, the surface area ranges from about 200 m$^2$/g to about 600 m$^2$/g.

Carbon nano-felts comprising nanofibers prepared from alkali lignin and a polymer according to the methods disclosed herein typically have a total pore volume as measured by $N_2$ sorption from about 0.02 cm$^3$/g to about 0.4 cm$^3$/g or even 0.6 cm$^3$/g. In one variation, the total pore volume is at least about 0.05 cm$^3$/g; in another variation, the total pore volume is at least about 0.1 cm$^3$/g. In yet another variation, the total pore volume is at least about 0.2 cm$^3$/g. In yet another variation, the total pore volume is at least about 0.3 cm$^3$/g. Alternately, the range of pore volume is from about 0.05 cm$^3$/g to about 0.5 cm$^3$/g or from about 0.1 cm$^3$/g to about 0.3 cm$^3$/g.

Carbon nano-felts comprising nanofibers prepared from alkali lignin and a polymer according to the methods disclosed herein typically have an average pore size between about 1 nm and about 20 nm as measured by $N_2$ adsorption. In one variation, the average pore size is no more than about 15 nm or no more than about 10 nm; in another variation, the average pore size is no more than about 9 nm or no more than about 8 nm. In another variation, the average pore size is no more than about 7 nm, no more than about 6 nm, or no more than about 5 nm. In yet another variation, the average pore size is no more than about 4 nm or no more than about 3 nm. In one variation, the average pore size is at least about 1 nm or at least about 2 nm. In one variation, the range of the average pore size is about 1 to about 3 nm or is about 2 to about 4 nm. In one variation, the carbon nanofibers of the present application have a peak pore volume greater than about 0.04 cm$^3$/nm/g for pores having a diameter less than about 5 nm. In another variation, the carbon nanofibers of the present application have a peak pore volume greater than about 0.08 cm$^3$/nm/g for pores having a diameter less than about 2 nm.

Activation of carbon materials is well-known in the art. For example, activation may be carried out by heating the carbon nanofibers described herein in an inert atmosphere to at least about 600° C. optionally at a rate of at least about 5° C./min. The nanofibers are held at this temperature, for example between 700° C. and 900° C., for at least about 10 minutes or for at least about 30 minutes. In one variation, during the activation step the nanofibers are exposed to $CO_2$ or steam, for example, between about 5% and about 15% of steam. For example, the nanofibers can be held at between 700° C. and 800° C. in an atmosphere of 200 mL/min of inert gas and 10 vol % of steam for at least about 30 minutes. Alternately, the nanofibers can be heated to and held at between about 800° C. and 900° C. under a carbon dioxide atmosphere. The degree of activation can be controlled by temperature and length of activation time. Activation results in an increase in surface area, an increase in pore volume and reduced the average pore size of carbon nanofibers.

Carbon nano-felts comprising nanofibers prepared from alkali lignin and a polymer according to the methods disclosed herein typically have a specific capacitance generally ranging from about 10 F/g to about 75 F/g or even up to about 100 F/g at a current density of 400 mA/g. Generally, the nano-felt prepared from the methods disclosed herein have a specific capacitance of at least about 25 F/g, at least about 30 F/g, at least about 35 F/g, at least about 40 F/g, at least about 45 F/g, at least about 50 F/g, at least about 55 F/g, at least about 60 F/g, at least about 65 F/g, at least about 70 F/g, at least about 75 F/g, at least about 80 F/g, at least about 85 F/g, at least about 90 F/g, or at least about 95 F/g. In one variation, the specific capacitance ranges from about 10 F/g to about 75 F/g at a current density of 400 mA/g. In one variation, the nano-felt has a specific capacitance of between about 10 F/g and about 75 F/g; in another variation, the nano-felt has a specific capacitance of between 20 F/g and about 65 F/g. In yet another variation, the specific capacitance is ranges up to about 75 F/g, up to about 100 F/g or up to about 125 F/g at a current density of 400 mA/g.

In one aspect, the present application discloses a method for the manufacture of carbon nanofibers comprising pre-carbonization heating wherein said pre-carbonization heating comprises heating stabilized intermediate nanofibers in an inert atmosphere up to at least about 400° C. at a heating rate of up to about 2° C. per minute yielding pre-carbonized nanofibers, wherein said intermediate nanofibers were previously stabilized by heating in an oxygen-containing atmosphere from room temperature to at least about 180° C. Alternately, the pre-carbonization heating comprises heating to at least about 500° C. at a heating rate of up to about 1° C. per minute.

In one embodiment, the method of manufacture further comprises carbonization heating of the pre-carbonized nanofibers, wherein said carbonization heating comprises heating said pre-carbonized nanofibers in an inert atmosphere between about 700° C. and about 2200° C. for at least about 30 minutes, yielding carbon nanofibers. The heating rate to the carbonization temperature is at least about 2° C. per minute, usually at least about 5° C. per minute or at least about 10° C. per minute. The nanofibers are carbonized for a length of time sufficient to reduce the presence of or remove most or even all non-carbon elements. Usually, the carbonized nanofibers have no non-carbon elements, or only negligible amounts of non-carbon elements. Such negligible amounts are usually less than 1%, alternately less than 0.5% or even less than 0.1% by weight.

In one variation of any disclosed aspect or embodiment, the pre-carbonization heating comprises heating said stabilized intermediate nanofibers from at least about 150° C. to between about 400° C. and about 600° C. at a heating rate of at least about 1° C. per minute and holding at a pre-carbonization temperature between about 400° C. and about 600° C. for a sufficient time to increase the crosslinking of the nanofibers and to begin to remove non-carbon elements and impurities from the nanofibers. Approaches for assessing crosslinking and for assessing removal of non-carbon elements and impurities are disclosed herein and would be apparent to one of ordinary skill in the art upon a review of the instant disclosure. In another variation, the pre-carbonization temperature is between about 450° C. and about 550° C. In yet another variation, the heating rate is up to about 0.5° C./min or is up to about 0.1° C./min, or even up to about 0.08° C./min or 0.05° C./min. In a further variation, the time to increase crosslinking and begin to remove non-carbon elements and impurities is up to about 1 hour or up to about 2 hours. In yet another variation, the stabilized intermediate nanofibers are prepared by electrospinning a mixture of alkali lignin and a polymer. In one embodiment, the electrospinning is solution electrospinning, wherein the polymer is optionally soluble in an aqueous solvent or in an non-aqueous solvent; in another embodiment, it is melt electrospinning. In another variation of any aspect or embodiment, the polymer is poly(vinyl alcohol). In an alternate variation, the polymer is polyacrylonitrile.

In another aspect, the present application discloses a method for preparing carbon nanofibers comprising electrospinning a mixture comprising alkali lignin and a polymer. In one embodiment, the polymer is soluble in an aqueous solvent. In another embodiment, the polymer is poly(vinyl alcohol). In one variation, the method comprises heating the electrospun alkali lignin/polymer nanofibers in an oxygen-containing atmosphere to a stabilization temperature of at least about 100° C. at a heating rate of no more than 2.0° C. per minute to yield stabilized nanofibers. In another variation, the method comprising heating the electrospun alkali lignin/polymer nanofibers in an oxygen-containing atmosphere to a stabilization temperature of at least about 200° C. at a heating rate of no more than about 1°/minute. In one embodiment, the method further comprises heating the stabilized nanofibers (i.e. the electrospun alkali lignin/polymer stabilized as described) in an inert atmosphere to a pre-carbonization temperature of at least about 400° C. at a heating rate of no more than about 0.5° C. per minute to yield pre-carbonized nanofibers. Alternately, the additional step in the method is heating the stabilized nanofibers in an inert atmosphere to a pre-carbonization temperature of at least about 500° C. at a heating rate of no more than about 0.2° C./minute.

In yet another aspect, the present application discloses a method for preparing carbon nanofibers comprising: (a) electrospinning a mixture of alkali lignin and a polymer; (b) heat treating said electrospun alkali lignin/polymer nanofibers wherein said heat treating comprises heating said nanofibers in an oxygen-containing atmosphere to a stabilization temperature of at least about 100° C. at a heating rate of no more than 2° C. per minute to yield stabilized nanofibers; (c) heating said stabilized nanofibers in an inert atmosphere up to a pre-carbonization temperature of at least about 400° C. at a heating rate of no more than about 0.2° C. per minute and holding said nanofibers at said pre-carbonization temperature for a sufficient time to increase crosslinking in said nanofibers to yield pre-carbonized nanofibers; and (d) heating said pre-carbonized nanofibers in an inert atmosphere up to a carbonization temperature of at least about 700° C. at a heating rate of no more than about 10° C. per minute and holding said nanofibers at said carbonization temperature for a sufficient time to remove most of the non-carbon impurities in said nanofibers. Approaches for assessing crosslinking and for assessing removal of non-carbon elements and impurities are disclosed herein and would be apparent to one of ordinary skill in the art upon a review of the instant disclosure.

In one embodiment, the nanofibers in (b) are heated at a rate of between about 0.05° C./minute and about 1° C./minute and said nanofibers in (c) are heated at a rate of no more than 0.1° C./minute and held at said pre-carbonization temperature for at least about 30 minutes and said nanofibers in (d) are held at said carbonization temperature for at least about 30 minutes.

In one variation of any of the disclosed aspects or embodiments, the polymer is soluble in an aqueous solvent. In another variation, the polymer is poly(vinyl alcohol). In yet another variation, the ratio of alkali lignin to poly(vinyl alcohol) (lignin/PVA) is between about 50/50 and about 85/15.

In one aspect, the present application discloses carbon nanofibers. In some embodiments, the carbon nanofibers are prepared according to the methods disclosed herein. In one embodiment, the carbon nanofibers have a specific surface area of at least about 500 m$^2$/g as measured by BET isotherm. In another embodiment, the carbon nanofibers have a total pore volume of at least about 0.1 cm$^3$/g or at least about 0.25 cm$^3$/g or at least about 0.3 cm$^3$/g as measured by N$_2$ gas sorption. In one variation, the carbon nanofibers have an average pore size no more than about 4 nm or an average pore size of no more than about 5 nm as measured by N$_2$ gas sorption. In another aspect, the present application discloses an electric double layer capacitor (EDLC) comprising a carbon nanofiber disclosed herein. In one embodiment, carbon nanofibers have a specific capacitance of at least 60 F/g.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Materials and Methods

Alkali lignin was obtained from Sigma-Aldrich (St. Louis, Mo., United States of America) with reported molecular weight of 10 kDa containing 4% sulfur (alkali lignin, low sulfur, CAS number 8068-05-1, catalog number 471003). Poly(vinyl alcohol) (PVA, CAS Number 9002-89-5, catalog number 363081), also from same supplier, was reported to have an average molecular weight of 85,000-124,000 and degree of hydrolysis of 87%~89% (11-13% acetyl groups). The lignin and PVA were used to prepare solutions for electrospinning without further purification.

Example 1

Melt Electrospinning

In a melt electrospinning setup, a tube of glass or stainless steel is heated over the melting temperature of PVA and alkali lignin, generally between 200° C. and 300° C. Such heating is achieved using a heating tape wrapped around the tube. A mixture of PVA and alkali lignin is fed into the heated tube and melts. An electrical field is applied to the melt via a metal wire placed in the melt; the wire is connected to a high voltage generator. The tube is held vertically and the charged molten mixture flows downward (due to gravity) toward a spinneret affixed at the end of tube. The melt is then ejected out from the spinneret and deposited on the collection plate (generally described below) that is 2-10 in. below the spinneret.

Solution Electrospinning

Alkali lignin was first dissolved into distilled water, and PVA was then dissolved into the prepared lignin/water solution at 75° C. by stifling for 4 hours. Aqueous solutions with varied lignin/PVA mass ratios were acquired with total concentration of 12 wt %. Subsequently, the alkali lignin/PVA solution was loaded into a 30 ml BD Luer-Lok™ plastic syringe (Fisher Scientific) having a stainless-steel needle with 90° blunt end and inner diameter of 0.4 mm. The electrospinning setup included an ES309P high voltage power supply (Gamma High Voltage Research, Inc., Ormond Beach, Fla., United States of America) and a nanofiber collector of electrically grounded aluminum foil that covered a roller with the diameter of 25 cm. The collector was placed 25 cm away from the tip of spinneret. Electrospinning was performed at room temperature and at a relative humidity at ~50%. During electrospinning, a positive high voltage of 25 kV was applied to the spinneret and a spin dope feeding rate of 1.2 mL/hour was maintained using a KDS-200 syringe pump (KD Scientific, Hollison, Mass., United States of America). The alkali lignin/PVA electrospun nanofibers were collected on the aluminum foil and the resultant alkali lignin/PVA nano-felt could be readily peeled off and stored in a desiccator before subsequent stabilization and carbonization.

Figure 2:
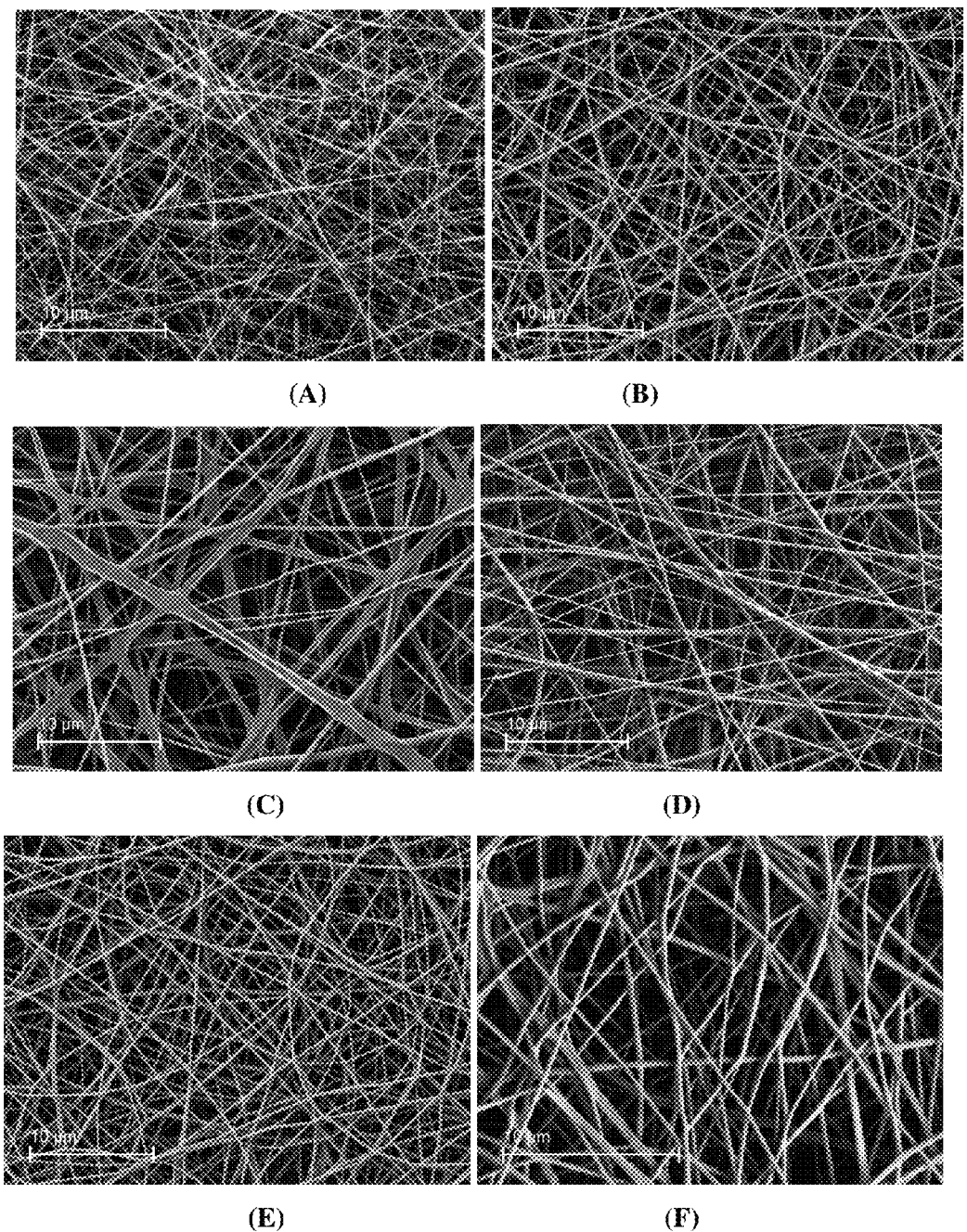
FIGS. 2A-2G are representative scanning electron micrograph (SEM) images of Batch #1 nanofibers prepared from a 50/50 alkali lignin/PVA mixture unless otherwise noted.
Figure 2:
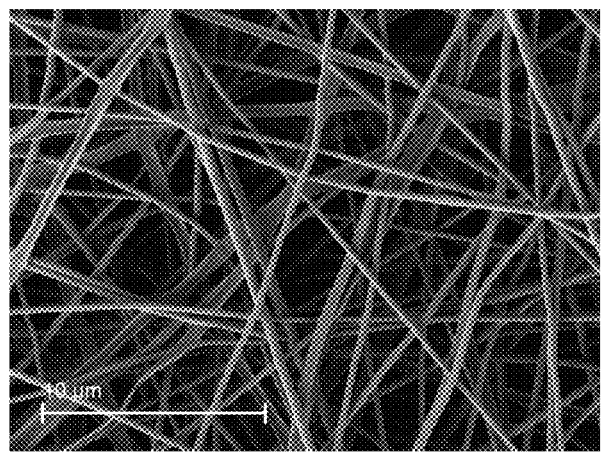
Figure 3:
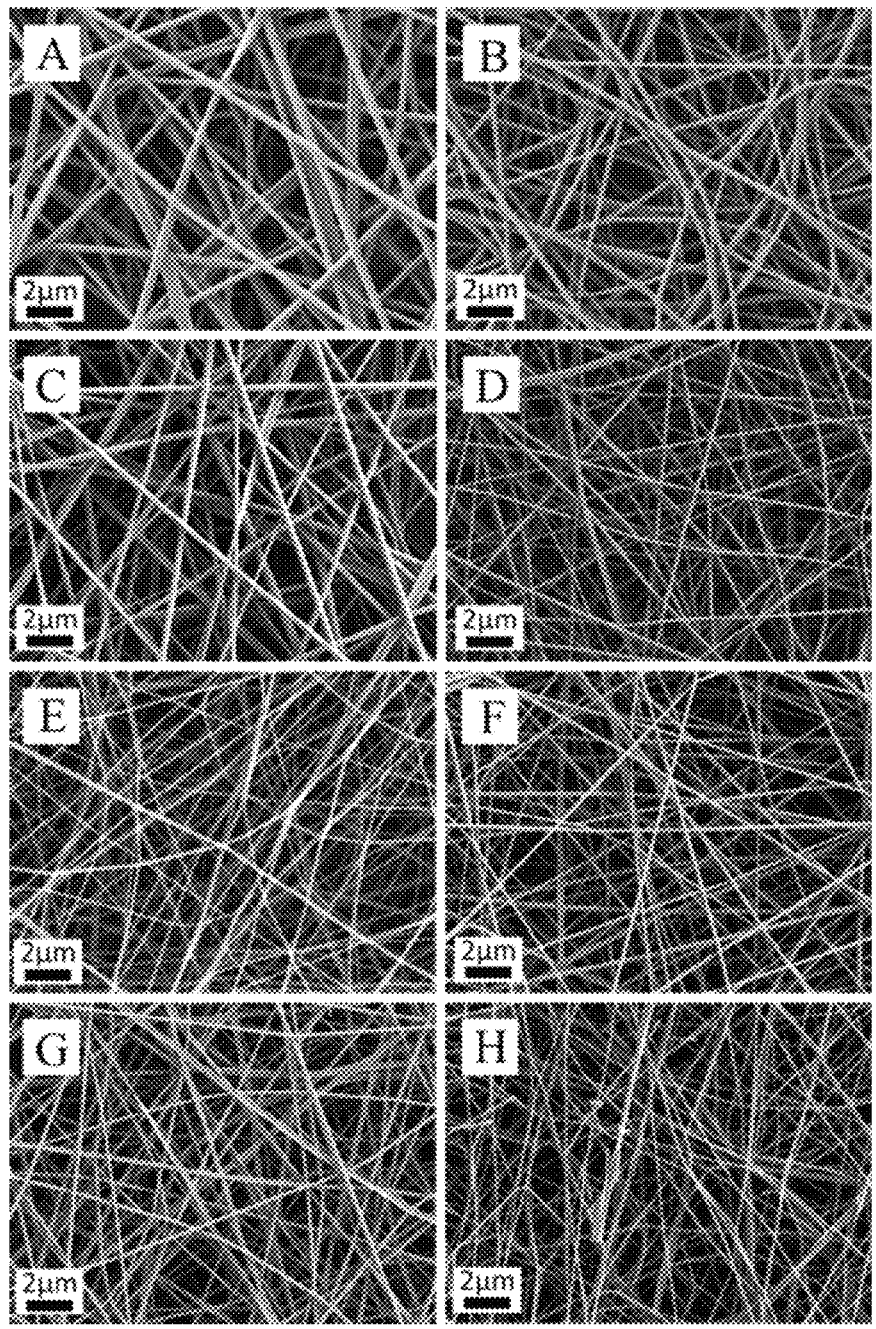
FIGS. 3A-3H are representative SEM images of Batch #2 alkali lignin/PVA precursor nanofibers (left column) and final carbon nanofibers (right column) derived from corresponding lignin/PVA nanofibers in left column: lignin/PVA mass ratio at 0/100 from 12% $H_2O$ solution (FIG. 3A, FIG. 3B), lignin/PVA at a mass ratio 30/70 from 10% $H_2O$ solution (FIG. 3C, FIG. 3D), lignin/PVA at a mass ratio of 50/50 from 9% $H_2O$ solution (FIG. 3E, FIG. 3F) and lignin/PVA at a mass ratio of 70/30 from 12% $H_2O$ solution (FIG. 3G, FIG. 3H).
Figure 4:
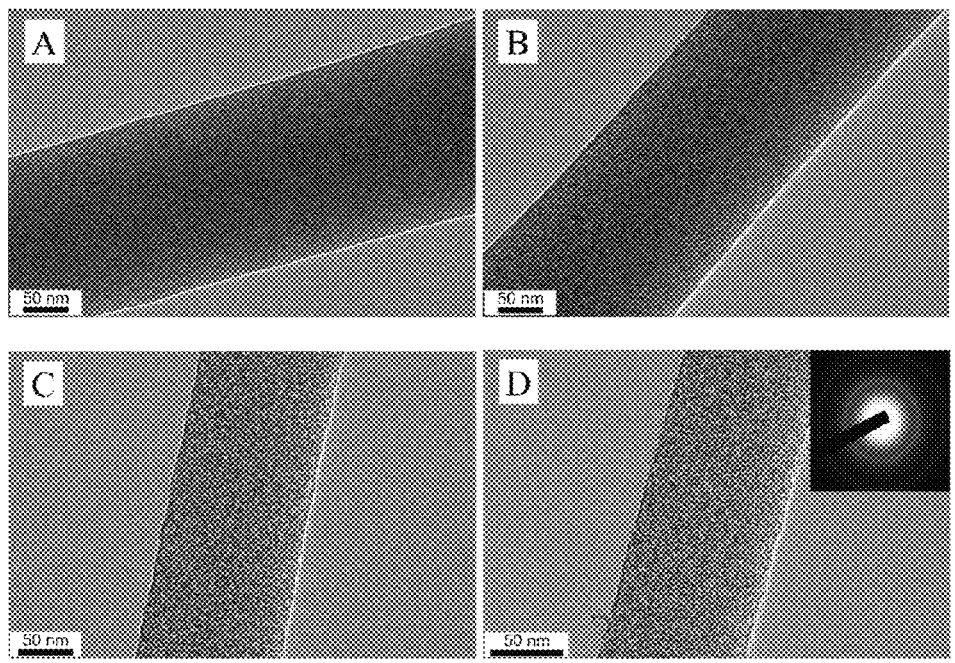
FIGS. 4A-4D are representative transmission electron micrograph (TEM) images of Batch #2 carbon nanofibers as described in FIG. 3.

FIGS. 2A, 2B and 2C show electrospun alkali lignin/PVA nanofibers prepared according to the solution electrospinning methods disclosed herein in Example 1. FIG. 2D shows a sample prepared from PVA and containing no lignin.

Figure 5:
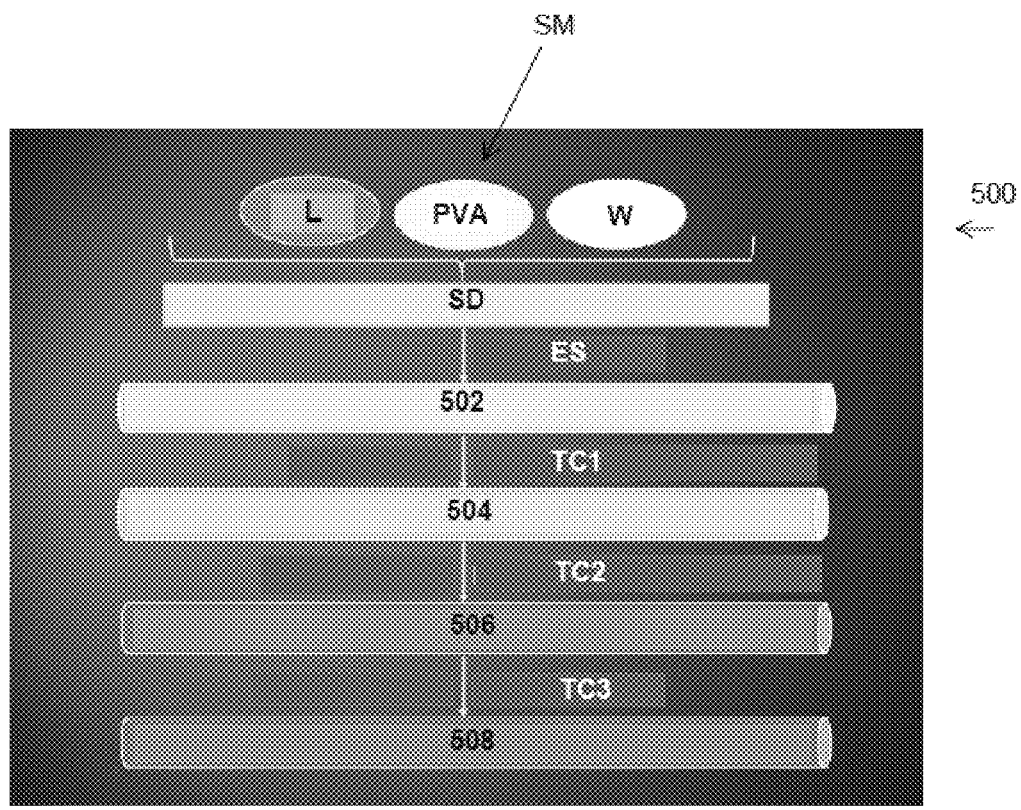
FIG. 5 shows a typical flow chart of one preparation of carbon nanofibers from lignin and aqueous polymer as disclosed herein.
Figure 6:
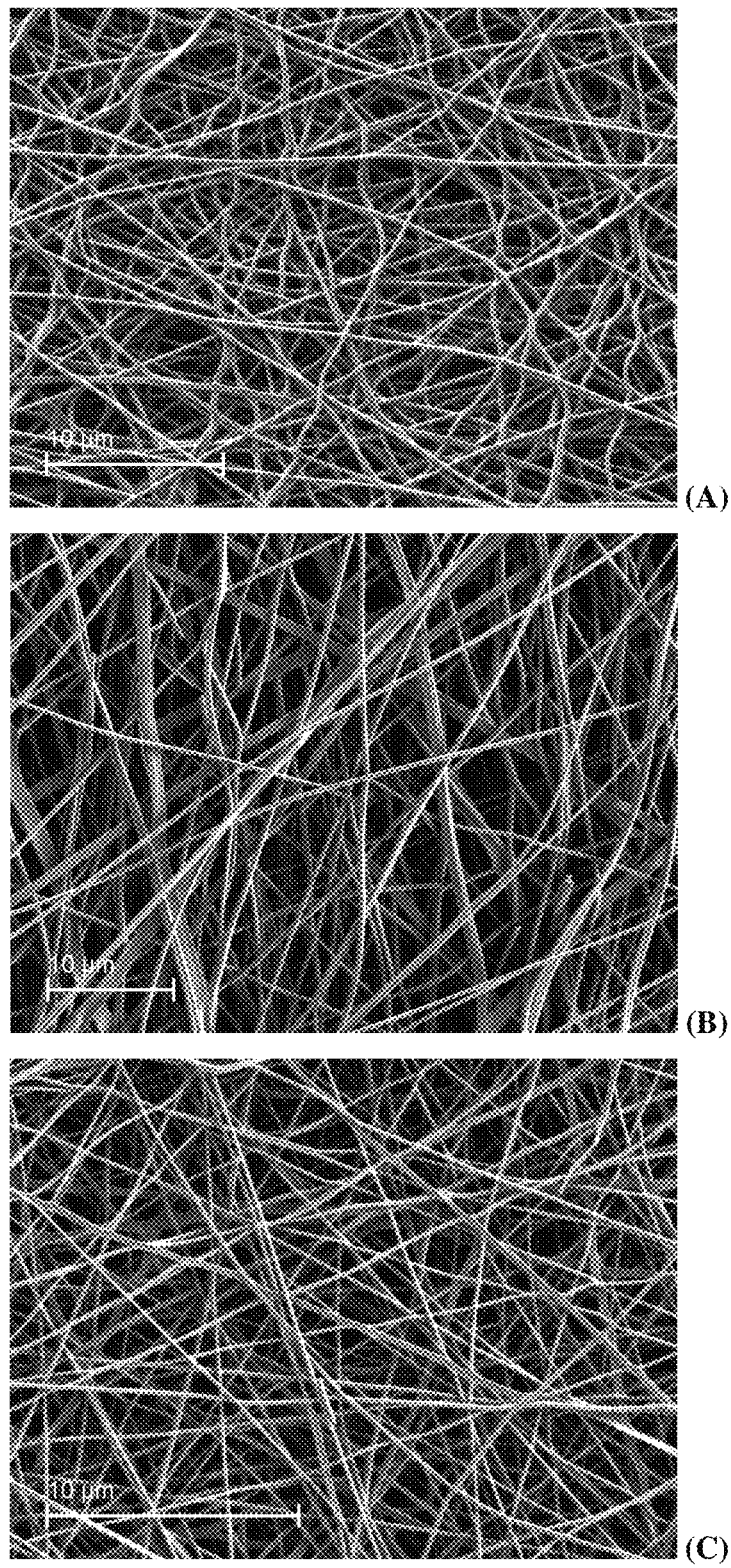
FIGS. 6A-6D are representative SEM images of Batch #1 carbon nanofibers.
Figure 6:
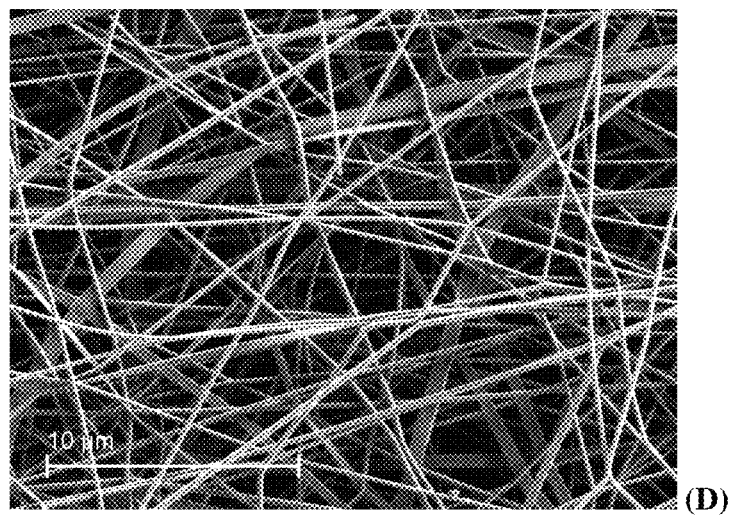

As represented generally in FIG. 5, the collected alkali lignin/PVA nanofiber mats were treated with a three-step progressive heat treatment including stabilization in air between 100° C. and 300° C., pre-carbonization in an argon atmosphere between 400° C. and 600° C., and final carbonization in an argon atmosphere between 800° C. and 2200° C. Careful thermo-stabilization prevents fiber fusing.

Referring now to FIG. 5 and a representative process in accordance with the presently disclosed subject matter is referred to generally at 500. Starting materials SM include lignin L, polyvinyl acetate PVA and water W. Starting materials SM are combined to provide spin dope SD. Spin dope SD is subjected to electrospinning ES to provide lignin/PVA nanofibers 502. Nanofibers 502 are subjected to treatment conditions TC1, which can include progressive heat treatment as disclosed herein such as up to 220° C. in air. After subjecting nanofibers 502 to treatment conditions TC1 intermediate nanofibers 504 are provided. Intermediate nanofibers 504 are subject to treatment conditions TC2 in accordance with the presently disclosed subject matter. Treatment conditions TC2 can involve progressive heat treatment in the presence of an inert gas, such as argon. For example, intermediate nanofibers 504 can be subject to progressive heat treatment up to 550° C. in the presence of argon. After subjecting intermediate nanofibers 504 to treatment conditions TC2, pre-carbon nanofibers 506 are provided. Pre-carbon nanofibers 506 can be subjected to carbonization such as by heat treatment up to 900° C. in the presence of an inert gas, such as argon. These conditions are referred to as treatment conditions TC3. After subjecting pre-carbon nanofibers 506 to treatment conditions TC3, carbon nanofibers 508 are provided.

Specifically, the stabilization and carbonization of the solution electrospun alkali lignin/PVA nanofibers were conducted in a Lindberg 54453 heavy duty tube furnace (TPS Co., Watertown, Wis., United States of America). Lignin/PVA nanofibers mats were tightly wrapped onto a stainless steel net. A constant flow of air was maintained through the furnace during the stabilization. The stabilization heating took place in four steps as follows:

Step 1. Heated from room temperature (30° C.) to 100° C. at 1° C./min.

Step 2. Heated from 100° C. to 180° C. at a rate of 0.05° C./min and held the sample at 180° C. for 16 hrs.

Step 3. Heated from 180° C. to 200° C. at a rate of 0.05° C./min and held the sample at 200° C. for 36 hrs.

Step 4. Heated from 200° C. to 220° C. at a rate of 0.05° C./min and held the sample at 220° C. for 8 hrs.

The stabilized nanofibers were then heated to 550° C. under argon with the heating rate set at 0.05° C./min; the pre-carbonization temperature was held mostly constant (±10° C.) for at least 30 min.

The resulting pre-carbon nanofibers were removed from the stainless steel net and then heated to 900° C. at a rate of 5° C./min under an argon atmosphere and held at 900° C. (±10° C.) for at least 1 hr. The nanofibers can optionally be left on the stainless steel net before the final carbonization step, assuming the melting point of the net is well-above the carbonization temperature used.

The final product, a carbon nanofiber mat, was flexible and composed of nanofibers with diameters from 100 nm to 1000 nm, with the majority ranging in diameter from 200 to 300 nm (see FIG. 2 and FIGS. 6A-6D).

All of the data discussed herein rely on a comparison of nanofibers prepared from solution electrospun alkali lignin/PVA nanofibers.

Figure 7:
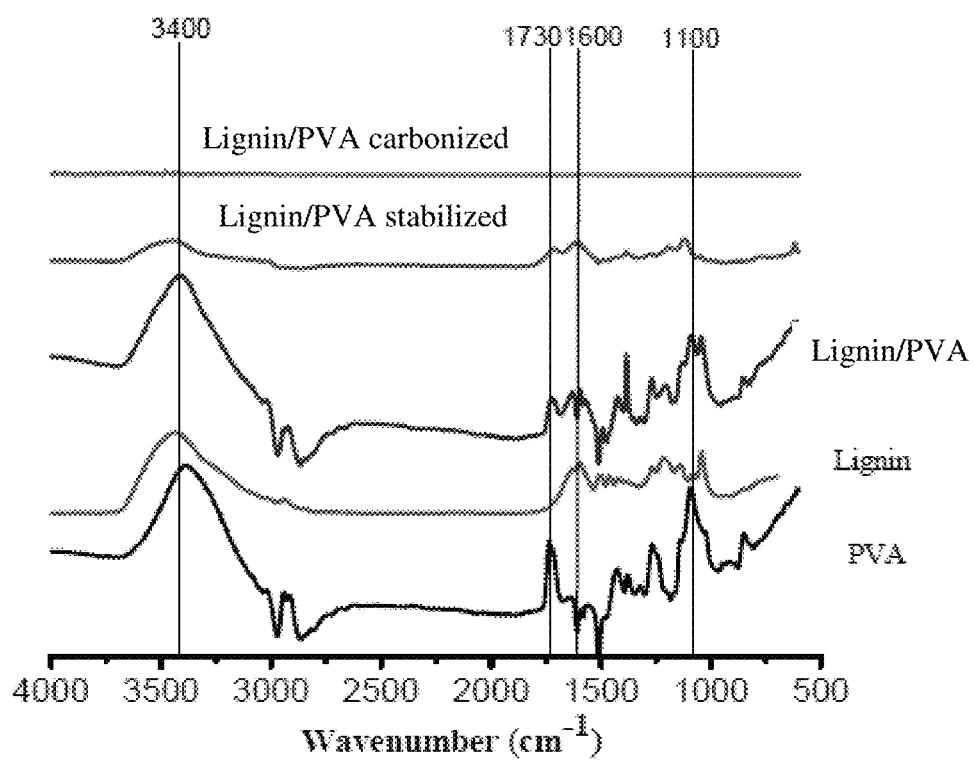
FIG. 7 is a plot of Fourier transform infrared (FTIR) spectra of each of Batch #1 lignin, PVA, 50/50 lignin/PVA nanofibers ("lignin/PVA"), stabilized 50/50 lignin/PVA nanofibers ("lignin/PVA stabilized") and carbon nanofibers ("lignin/PVA carbonized").

FTIR spectra of as-electrospun, stabilized, and carbonized alkali lignin/PVA were acquired using a Bruker Tensor-27 FTIR spectrometer (Bruker,). As shown in FIG. 7, FTIR spectra of the alkali lignin/PVA as-spun nanofiber mats showed both characteristic peaks of alkali lignin and PVA. The stabilized alkali lignin/PVA sample showed much weaker IR peaks. Without being bound by theory, it is believed that the weaker IR peaks indicate the occurrence of cross-linking in the nanofibers. The carbonized alkali lignin/PVA sample did not show any differentiable IR peaks, suggesting removal of non-carbon elements and impurities.

Figure 8:
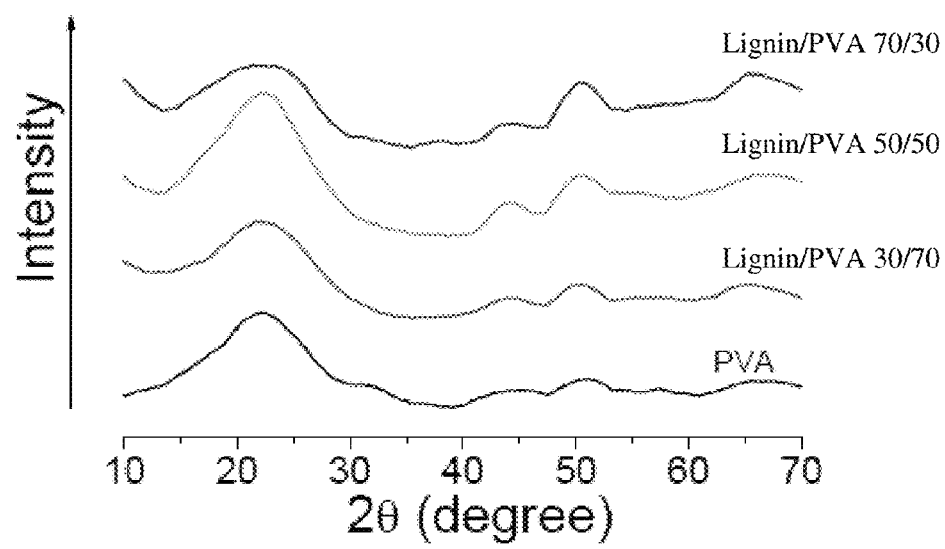
FIG. 8 is a plot of X-ray diffraction (XRD) data of Batch #1 carbon nanofibers prepared from a sampling of different lignin/PVA ratios: pure PVA; 30/70 lignin/PVA; 50/50 lignin/PVA and 70/30 lignin/PVA.

A rotating X-ray generator (40 kW, 40 mA, Rigaku Ultima Plus X-ray diffractometer, Rigaku, Japan) with CuKα radiation (wavelength $\lambda=1.54$ Å) was used to collect the X-ray diffraction pattern (XRD). As shown in FIG. 8A, XRD patterns of carbonized alkali lignin/PVA nanofibers from samples with varied alkali lignin/PVA mass ratios showed a similar broad peak between $2\theta=20$-$25°$, generally indicating their amorphous carbon state.

The specific surface area of the product carbon nanofibers was measured by adsorption using the BET isotherm with $N_2$ adsorption. The carbon nano-felt developed from samples containing alkali lignin possessed much higher specific surface area than pure PVA-based carbon nano-felt (Table 1). The specific surface area increased with lignin content and reached ~500 $m^2/g$ at 70/30 mass ratio of alkali lignin/PVA, approximately a 20 times increase.

TABLE 1

BET specific surface area, total pore volume and average pore size of carbon nano-felts developed from alkali lignin/PVA electrospun nanofibers (acquired from $N_2$ gas adsorption)

| Samples alkali lignin/PVA | BET specific surface area ($m^2/g$) | Total pore volume ($cm^3/g$) | Average pore size (nm) |
|---|---|---|---|
| 0/100 | 25 | 0.04 | 11 |
| 30/70 | 47 | 0.07 | 7 |
| 70/30 | 485 | 0.28 | 3.7 |

Example 2

A second batch of carbon nanofibers were prepared according to the solution electrospinning generally described in Example 1. The alkali lignin/polymer nanofibers were heat stabilized as further described above. The stabilized nanofibers were then heated to 450° C. under argon with the heating rate set at 0.05° C./min; the 450° C. pre-carbonization temperature was held mostly constant (±10° C.) for at least 30 min.

The resulting pre-carbon nanofibers were then heated to 1200° C. at a rate of 5° C./min under an argon atmosphere and held at 1200° C. (±10° C.) for at least 1 hr; this carbonization heating yielded carbon nanofibers.

FIGS. 3A, 3C, 3E and 3G provide SEM (Zeiss Supra™ 40VP field-emission scanning electron microscope, Zeiss) images of electrospun alkali lignin/PVA nanofibers with average diameter of 300-500 nm. Average fiber diameters of each sample were obtained by measuring the diameters of 50 randomly selected nanofibers in corresponding SEM image using the ImageJ™ image processing software (Image Processing and Analysis in Java, available as a free download from the NIH http://rsb.info.nih.gov/ij/). The average size of the lignin/PVA nanofibers decreased with an increase of lignin content from ~220 nm at 30% lignin, to ~170 nm at 50% lignin, and to ~140 nm at 70% lignin (FIGS. 3A, 3C, 3E and 3G). Without being bound by theory, such a reduction can result from decreased viscosity and increased conductivity of the spin dope when PVA was replaced by lignin. The decreased viscosity was attributed to the smaller molecular weight of lignin while the increased conductivity was attributed to high content of inorganic salts in lignin. With the increase of lignin proportion in spin dope, more and more ribbon-like fiber morphology was observed, suggesting that high lignin content tends to result in thin tube-like jet during electrospinning which can collapse with rapid vaporization of solvent from the jet surface.

Generally, the carbon nanofibers maintained their precursors' fibrous structures. The average diameters of the carbon nanofibers were significantly smaller than their precursor fibers. The average diameter of carbon nanofibers from PVA alone was ~210 nm while the average diameters of those carbon nanofibers from lignin/PVA containing 30%, 50%, and 70% lignin were ~150 nm, ~130 nm, and ~100 nm, respectively, approximately 30% reduction. Carbonization causes the release of hydrogen, oxygen, and sulfur elements from the structures; carbonization leads to fiber size reduction and formation of 3D carbonaceous structures. The carbon nanofibers disclosed herein generally have a diameters less than 400 nm. The lignin based carbon nanofiber mats possessed excellent mechanical flexibility and resilience; they could be folded into a hollow cylinder without breaking.

The microstructures of carbon nanofiber mats were investigated by transmission electron microscopy (TEM, Hitachi H-7000 FA quipped with a Kevex™ energy-dispersive X-ray spectrometer, Hitachi, Japan). The TEM specimens were prepared by dispersing carbon nanofibers in ethanol followed by dripping nanofiber suspension over copper grids with lacey carbon film.

High-resolution TEM images of lignin based carbon nanofibers showed consistent fiber sizes with SEM observations (FIGS. 3A, 3B, 3C and 3D). The carbon nanofibers from electrospun PVA and 30/70 lignin/PVA had relatively smooth surface while the other two samples from electrospun 50/50 and 70/30 lignin/PVA possessed rough surface. TEM images also revealed that all carbon nanofibers contained mostly amorphous carbon. There was no appreciable carbon structure variation with the increase of lignin proportion in lignin/PVA precursor fibers at the carbonization temperature employed.

The average fiber diameter generally decreased with the increase of alkali lignin content. Additionally, the alkali lignin/PVA nanofibers contained no microscopically identifiable beads and/or beaded-nanofibers, and they were uniform with relatively small variation in diameters.

Figure 9A:
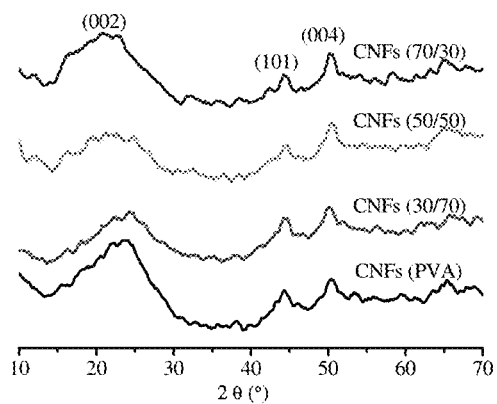
FIG. 9A is a plot of XRD data of Batch #2 carbon nanofibers (CNFs) prepared from a sampling of different lignin/PVA ratios: pure PVA ("CNFs(PVA)"), 70/30 lignin/PVA ("CNFs (70/30)"), 50/50 lignin/PVA ("CNFs (50/50)"), and 30/70 lignin/PVA ("CNFs (30/70)").

XRD analysis was carried out to further investigate the microstructures in lignin-based carbon nanofibers. As shown in FIG. 9A, a broad diffraction peak was observed for all carbon nanofiber samples at $2\theta$ angles between 20° and 30°, which was attributed to the crystallographic plane of (002) in graphitic structure and the broadness indicated a low degree of graphitization, smaller graphitic crystallites, and corresponding amorphous nature. The two weak diffractions peaks centered at $2\theta$ angles of 44° and 51° were ascribed to the graphite crystallographic planes of (100) and (004), respectively. The average interplanar spacing "d(002)", calculated by the Bragg equation, increased from 0.3713 nm for carbon nanofibers from pure PVA to 0.3737 nm, 0.401 nm, 0.4178 nm, respectively, for carbon nanofibers from lignin/PVA fibers containing 30%, 50%, and 70% lignin. The distance increase between graphite layers in carbon nanofibers indicated a lower density, suggesting that more porous carbon structure was derived from carbonization of alkali lignin/PVA precursor fibers with higher lignin content.

Figure 9B:
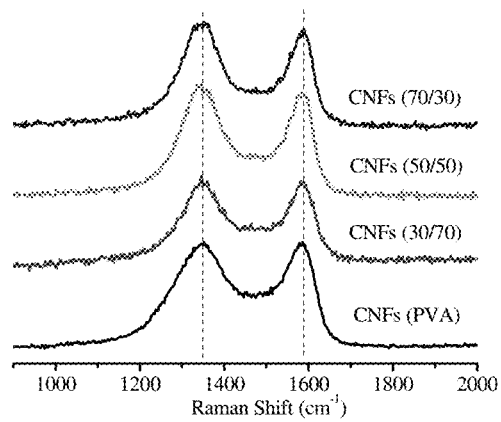
FIG. 9B is a plot of Raman spectra of Batch #2 carbon nanofibers (CNFs) prepared from a sampling of different lignin/PVA ratios: pure PVA ("CNFs(PVA)"), 70/30 lignin/PVA ("CNFs (70/30)"), 50/50 lignin/PVA ("CNFs (50/50)"), and 30/70 lignin/PVA ("CNFs (30/70)").

Raman spectra of Batch #2 lignin based carbon nanofibers exhibited two characteristic bands at 1350 cm$^{-1}$ and 1580 cm$^{-1}$ (FIG. 9B). The band centered near 1350 cm$^{-1}$ is related to disordered turbostratic structures and generally referred as "D-band"; while the band centered near 1580 cm$^{-1}$ is related to ordered graphitic structures and generally referred as "G-band". The "D-band" results either from vibrations of carbon atoms with dangling bonds in crystal lattice plane terminations of disordered graphite or from defects in the curved grapheme sheets. The "G-band" is associated with sp$^2$ vibrations of ordered graphitic structures. The intensity ratio of the "D-band" to the "G-band" ("$I_D/I_G$", known as the "R-value") indicates the structurally disorder of graphite crystallites in carbon materials. R-values of lignin based carbon nanofibers increased monotonically from 0.99 to 1.08 as the lignin weight fraction in the precursor nanofibers increased from 0% to 70%, respectively, suggesting the transformation of graphite crystallites to more disordered state with the increase of lignin content in alkali lignin/PVA precursor fibers, which consistent with TEM and XRD results. Keeping all other variables constant, a higher carbonization temperature may lead to a more crystalline structure.

Figure 10A:
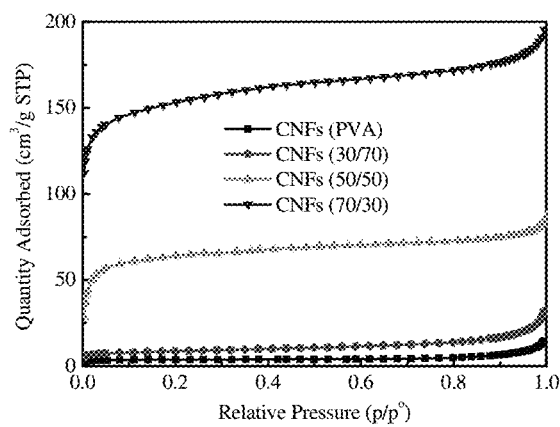
FIG. 10A is a plot of a nitrogen sorption isotherm of lignin based carbon nanofibers described in FIG. 9. ▪ CNFs (PVA); ● CNFs (30/70); ▲ CNFs (50/50); and ▼ CNFs (70/30).
Figure 10B:
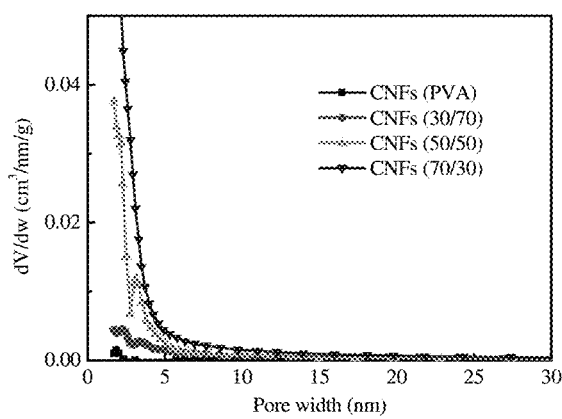
FIG. 10B is a plot of the pore size distributions for those lignin-based carbon nanofibers described in FIG. 9. The pore size distribution was evaluated by applying the Barret-Joyner-Halenda (BJH) method. ▪ CNFs (PVA); ● CNFs (30/70); ▲ CNFs (50/50); and ▼ CNFs (70/30).

The BET (Brunauer-Emmett-Teller) specific surface area, total pore volume and average pore size of the carbon nanofelt were determined via N$_2$ gas adsorption (Table 2) at −196° C. through Micromeritics Analytical Services (Norcross, Ga., United States of America). N$_2$ gas sorption was used to characterize the specific surface area, pore size distribution, average pore size, and pore volume of the lignin based carbon nanofibers (FIGS. 10A and 10B, Table 2, Table 3). The nitrogen adsorption plots shown in FIG. 10A can be classified as type II under Brunauer classification. The N$_2$ adsorption behavior that was observed including adsorption in low pressure region (P/P$_0$<0.1), gradually increased adsorption in middle P/P$_0$ region, and further adsorption increase in high pressure region (>0.9 P/P$_0$) were ascribed to the N$_2$ adsorption in micropores, mesopores, and multilayer adsorption of mesopores, respectively. Among all carbon nanofiber samples, CNFs (PVA) showed the lowest specific surface area of 14 m$^2$/g, the largest average pore size of 19.4 nm, and the smallest pore volume of 0.022 cm$^3$/g. With the increase of lignin content in lignin/PVA precursor fibers, both specific surface area and pore volume of corresponding carbon nanofibers increased monotonically while the average pore size of these carbon nanofibers was decreased. CNFs (70/30), the carbon nanofiber sample from lignin/PVA precursor containing highest proportion of lignin (70%), demonstrated a highly porous structure. Compare to CNFs (PVA), the specific surface area and total pore volume of CNFs (70/30) significantly increased to 583 m$^2$/g and to 0.289 m$^3$/g, respectively, while average pore size reduced by 80% to 3.5 nm.

TABLE 2

BET specific surface area, total pore volume and average pore size of carbon nano-felts developed from alkali lignin/PVA electro spun nanofibers

| Samples alkali lignin/PVA | BET specific surface area (m$^2$/g) | Total pore volume (cm$^3$/g) | Average pore size (nm) |
| --- | --- | --- | --- |
| 0/100 | 13.96 | 0.022 | 19.36 |
| 30/70 | 30.61 | 0.049 | 8.94 |
| 50/50 | 247.9 | 0.136 | 3.48 |
| 70/30 | 582.5 | 0.298 | 3.53 |

TABLE 3

Pore volume of carbon nano-felts developed from alkali lignin/PVA electrospun nanofibers

| Lignin/PVA (0/100) | | Lignin/PVA (30/70) | | Lignin/PVA (50/50) | | Lignin/PVA (70/30) | |
| --- | --- | --- | --- | --- | --- | --- | --- |
| Pore size (nm) | Pore volume (dV/dw) (cm$^3$/nm/g) | Pore size (nm) | Pore volume (dV/dw) (cm$^3$/nm/g) | Pore size (nm) | Pore volume (dV/dw) (cm$^3$/nm/g) | Pore size (nm) | Pore volume (dV/dw) (cm$^3$/nm/g) |
| 10.96 | 0.0003 | 10.96 | 0.0007 | 10.25 | 0.0007 | 11.00 | 0.0014 |
| 9.69 | 0.0003 | 9.68 | 0.0008 | 8.98 | 0.0007 | 9.76 | 0.0015 |
| 8.54 | 0.0003 | 8.53 | 0.0008 | 7.98 | 0.0009 | 8.59 | 0.0019 |
| 7.62 | 0.0003 | 7.62 | 0.0009 | 7.17 | 0.0011 | 7.67 | 0.0022 |
| 6.87 | 0.0002 | 6.87 | 0.0010 | 6.51 | 0.0012 | 6.92 | 0.0024 |
| 6.26 | 0.0002 | 6.25 | 0.0011 | 5.95 | 0.0014 | 6.30 | 0.0028 |
| 5.74 | 0.0001 | 5.73 | 0.0012 | 5.47 | 0.0018 | 5.77 | 0.0033 |
| 3.07 | 0.0000 | 5.29 | 0.0014 | 5.05 | 0.0024 | 5.31 | 0.0038 |
| 2.28 | 0.0002 | 4.89 | 0.0016 | 4.69 | 0.0031 | 4.92 | 0.0044 |
| 2.00 | 0.0011 | 4.55 | 0.0017 | 4.37 | 0.0039 | 4.57 | 0.0054 |
| 1.86 | 0.0015 | 4.24 | 0.0018 | 4.08 | 0.0048 | 4.26 | 0.0067 |
| 1.71 | 0.0011 | 3.97 | 0.0021 | 3.82 | 0.0058 | 3.98 | 0.0083 |
| | | 3.72 | 0.0025 | 3.54 | 0.0084 | 3.73 | 0.0106 |
| | | 3.49 | 0.0027 | 3.30 | 0.0109 | 3.50 | 0.0136 |
| | | 3.28 | 0.0027 | 3.14 | 0.0118 | 3.29 | 0.0176 |
| | | 3.09 | 0.0024 | 2.98 | 0.0112 | 3.10 | 0.0220 |
| | | 2.91 | 0.0023 | 2.78 | 0.0068 | 2.93 | 0.0270 |

TABLE 3-continued

Pore volume of carbon nano-felts developed from alkali lignin/PVA electrospun nanofibers

| Lignin/PVA (0/100) | | Lignin/PVA (30/70) | | Lignin/PVA (50/50) | | Lignin/PVA (70/30) | |
|---|---|---|---|---|---|---|---|
| Pore size (nm) | Pore volume (dV/dw) (cm³/nm/g) | Pore size (nm) | Pore volume (dV/dw) (cm³/nm/g) | Pore size (nm) | Pore volume (dV/dw) (cm³/nm/g) | Pore size (nm) | Pore volume (dV/dw) (cm³/nm/g) |
| | | 2.74 | 0.0026 | 2.50 | 0.0150 | 2.75 | 0.0320 |
| | | 2.58 | 0.0035 | 2.29 | 0.0256 | 2.59 | 0.0365 |
| | | 2.43 | 0.0043 | 2.15 | 0.0314 | 2.44 | 0.0405 |
| | | 2.28 | 0.0045 | 2.01 | 0.0326 | 2.30 | 0.0449 |
| | | 2.14 | 0.0043 | 1.87 | 0.0339 | 2.16 | 0.0512 |
| | | 2.00 | 0.0040 | 1.71 | 0.0375 | 2.01 | 0.0610 |
| | | 1.86 | 0.0040 | | | 1.87 | 0.0721 |
| | | 1.71 | 0.0044 | | | 1.71 | 0.0833 |

Electrochemical Characterization

Figure 11:
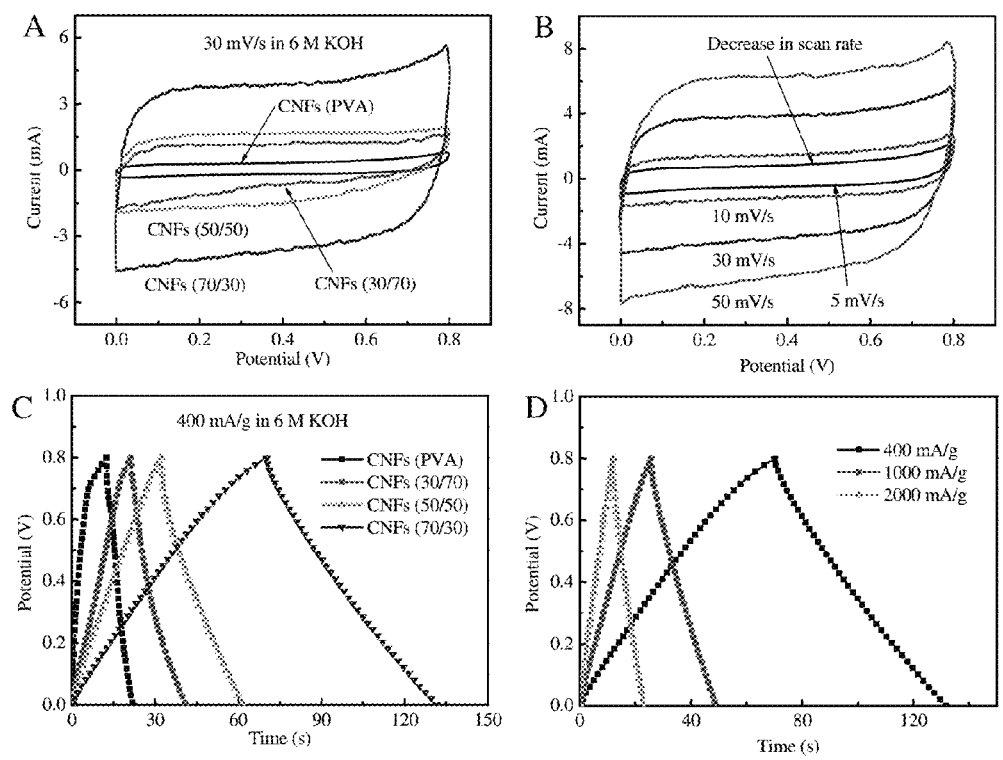
FIGS. 11A-11D are plots showing electrochemical characterization of lignin based carbon nanofiber electrodes in 6 M KOH aqueous electrolyte at room temperature: Cyclic voltammograms of lignin-based carbon nanofibers as described in FIG. 9 at a scan rate of 30 mV/s with a potential range of 0-0.8 V (FIG. 11A); Cyclic voltammograms of CNFs (70/30) at varied scan rates (5-50 mV/s) (FIG. 11B); Galvanostatic charge-discharge curves at a current density of 400 mA/g (FIG. 11C; ▪ CNFs (PVA), ● CNFs (30/70), ▲ CNFs (50/50), and ▼ CNFs (70/30)); Galvanostatic charge-discharge curves of lignin-based carbon nanofibers as described in FIG. 9 of CNFs (70/30) at varied current density (FIG. 11D; ▪ 400 mA/g, ● 1000 mA/g, and ▲ 2000 mA/g).

The electrochemical capacitive performances of lignin based carbon nanofibers were investigated using cyclic voltammetry (CV), galvanostatic charge/discharge, and electrochemical impedance spectroscopy (EIS). Typical CV curves of lignin based carbon nanofiber electrodes were acquired at a scan rate of 30 mV/s with a potential range of 0-0.8 V in 6 M KOH aqueous electrolyte (FIG. 11A). CV curves of carbon nanofibers from lignin/PVA precursor fibers containing more lignin presented better quasi-rectangular shapes, indicating that these carbon nanofiber materials are excellent candidates as electrode materials for supercapacitor uses. The CV curve of CNFs (70/30), the carbon nanofiber sample from lignin/PVA precursor containing highest proportion of lignin (70%), exhibited largest area of the loop among all four samples, suggesting its highest gravimetric capacitance. Sample CNFs (70/30) was further scanned at varied scan rates from 5 mV/s to 50 mV/s (FIG. 11B). With the increase of voltage sweep rate, CV curves preserved their quasi-rectangular shape, indicating a highly reversible supercapacitor behavior in 6 M KOH electrolyte within the abovementioned potential range.

Galvanostatic charge/discharge is commonly used to test the performance of electrochemical capacitors. The charge/discharge curves of lignin based carbon nanofiber electrodes were obtained at a constant current density of 400 mA/g with a potential range of 0 to 0.8 V in 6 M KOH aqueous electrolyte (FIG. 11C). The approximate isosceles charge-discharge curves of these lignin based carbon nanofiber electrodes, particularly CNFs (70/30), correspond to excellent capacitive performance and great electrochemical stability and reversibility. The galvanostatic charge/discharge behavior of a CNFs (70/30) electrode was further at various current densities in the range of 400 mA/g to 2000 mA/g. (FIG. 11D). These charge/discharge curves are almost linear and regular isosceles triangles indicates excellent supercapacitor behavior.

Gravimetric capacitances of lignin based carbon nanofiber electrodes were evaluated according to the following equation:

$$C = \frac{2 \times I \times \Delta t}{\Delta V \times m}$$

where I is discharge current in ampere (A), $\Delta V$ is potential difference during discharge in volt (V), $\Delta t$ is discharge time in the chosen potential window in second (s), m is mass of single electrode in gram (g), and C is gravimetric capacitance (F/g). Gravimetric capacitances of CNFs (PVA), CNFs (30/70), CNFs (50/50), and CNFs (70/30) carbon nanofiber electrodes at current density of 400 mA/g are accordingly 10 F/g, 20 F/g, 32 F/g, and 64 F/g, respectively (Table 4).

TABLE 4

Specific capacitance (F/g) determined from carbon nano-felts developed from alkali lignin/PVA electrospun nanofibers at a discharge rate of 400 mA/g by a supercapacitor tester (BT2000, Arbin Instruments, TX)

| alkalilignin/PVA | 0/100 | 30/70 | 50/50 | 70/30 |
|---|---|---|---|---|
| Specific capacitance (F/g) | 10.0 | 20.5 | 32.2 | 63.8 |

Without being bound by theory, the monotonic increase of gravimetric capacitance is believed to be associated with the decrease of average pore size and the increase of specific surface area in the carbon nanofibers as lignin proportion in the lignin/PVA precursor fibers increases. Gravimetric capacitances of the CNFs (70/30) electrode at current densities of 400 mA/g, 1000 mA/g, and 2000 mA/g are 64 F/g, 61 F/g, and 50 F/g, respectively. As current density increases, the capacitance decreases slightly. Nearly 78% of the initial capacitance was retained at a relatively large current density of 2000 mA/g when CNFs (70/30) was used as electrode, suggesting that CNFs (70/30) is even suitable for fast ion transportation and high current density applications.

Geometry generally dictates that the smaller the pores within a nano-felt, the larger the specific surface area. A large specific surface area generally corresponds to a high specific capacitance, as long as the small pores are accessible to electrolyte. Without being bound by theory, it is believed that a large pore volume contribution from the smallest pores accessible to the electrolyte ion will tend to correlated to high specific capacitance.

Figure 12:
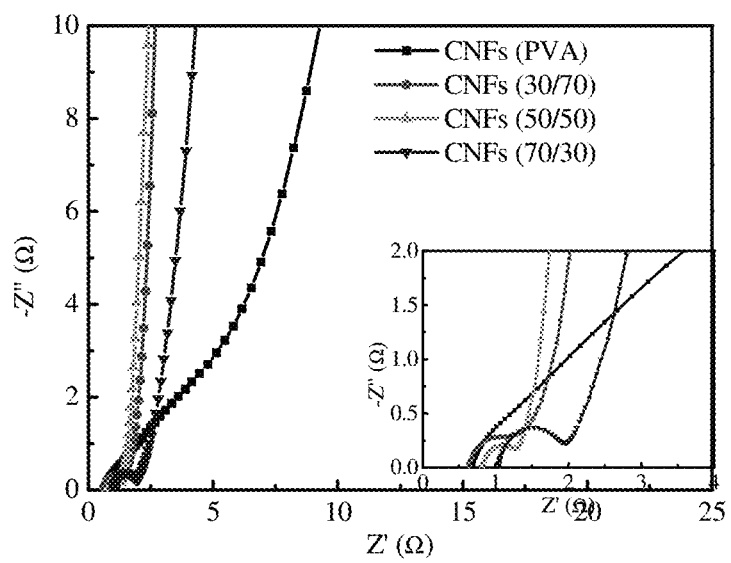
FIG. 12 is a set of Nyquist plots of Batch #2 carbon nanofiber electrodes in 6 M KOH aqueous electrolyte. Z' and Z" are the real and imaginary parts, respectively, of the complex impedance Z. The inset is the magnified high frequency region. ▪ CNFs (PVA); ● CNFs (30/70); ▲ CNFs (50/50); and ▼ CNFs (70/30).

Electrochemical impedance spectroscopy (EIS) is a powerful technique to obtain pore information as well as dynamic ion diffusion information in a porous electrode. The complex-plane impedance plots (Nyquist plots) of lignin based carbon nanofiber electrodes showed depressed semicircles at high frequency and straight lines nearly vertical to the realistic impedance axis at low frequency while no semicircle was observed at high frequency on the plot of CNFs (PVA). The diameter of those semicircles increased with lignin content in lignin/PVA precursor fibers. The shape of Nyquist plots in FIG. 12 suggested more cylindrical pores in carbon nanofibers derived from PVA alone and more turbination-shaped pores in carbon nanofibers derived from lignin/PVA precursor fibers. The observed semicircle diameters suggest decreased ion adsorption efficiency corresponding to an increase of lignin content in precursor fibers. Generally, the smaller pore size, the more reduced the efficiency of ion diffusion is. Although CNFs (70/30) and CNFs (50/50) have similar average pore size from BET surface area analysis, these two samples showed large difference on their Nyquist curves, indicating CNFs (70/30) contained a significant amount of smaller pores that CNFs (50/50) did not possess.

Figure 13:
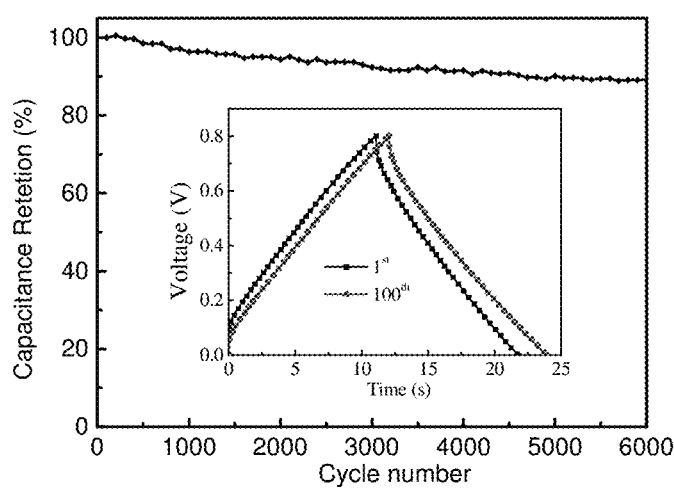
FIG. 13 is a plot showing cycling stability of CNFs (70/30) as a supercapacitor electrode material at current density of 2000 mA/g. The inset is the charge/discharge curves of the $1^{st}$ and the $100^{th}$ cycle at 2000 mA/g. ▪ 1st; ● 100th.

Long cycling life is an important parameter for supercapacitor electrode materials. The stability of the capacitance performance of CNFs (70/30) was evaluated by employing galvanostatic charge/discharge test 6,000 cycles between 0 and 0.8 V at a high constant current density of 2000 mA/g (FIG. 13). The gravimetric capacitance only dropped by ca. 10% after 6,000 cycles of charge and discharge, indicating quite good electrochemical stability of CNFs (70/30) electrode.

Flexible and sustainable electrode material for high performance supercapacitors were successfully prepared as disclosed herein by electrospinning alkali lignin and poly (vinyl alcohol) (PVA) aqueous solutions with up to 70 wt. % lignin followed by stabilization and carbonization. The lignin based carbon nanofibers retained their precursors' fiber morphology very well and showed at least about ~30% size reduction. With an increase of lignin content in precursor (lignin/PVA) nanofibers, the corresponding carbon nanofibers held smaller average pore size, larger pore volume, and more specific surface area, but more disordered carbon structure. Carbon nanofibers from the precursor fibers containing 70 wt. % lignin have an average fiber size of ~100 nm and BET specific surface area of 583 $m^2/g$. The lignin-based carbon nanofiber mats demonstrated high performance as binder-free electrode material for supercapacitors. CNFs (70/30) not only showed high gravimetric capacitance of 64 F/g at current density of 400 mA/g and 50 F/g at 2,000 mA/g but also possessed excellent cycling stability that the gravimetric capacitance dropped only by ca. 10% after 6,000 cycles of charge and discharge. As demonstrated herein, lignin based carbon nanofibers are sustainable electrode materials suitable for flexible high performance supercapacitors.

Example 3

The carbon nanofibers of Example 1 or Example 2 are activated by heating the carbon nanofibers in an inert atmosphere to at least about 700° C. at a rate of about 5° C./min. The nanofibers are held at this temperature for at least about 10 minutes and at the same time exposed to 10 vol % steam. The activated carbon nanofibers have an increased surface area, increased pore volume and reduced average pore size compared to unactivated carbon nanofibers of Example 1 and Example 2.

The patents and publications listed herein describe the general skill in the art and are hereby incorporated by reference in their entireties for all purposes and to the same extent as if each was specifically and individually indicated to be incorporated by reference. In the case of any conflict between a cited reference and this specification, the specification shall control. In describing embodiments of the present application, specific terminology is employed for the sake of clarity. However, the presently disclosed subject matter is not intended to be limited to the specific terminology so selected. Nothing in this specification should be considered as limiting the scope of the presently disclosed subject matter. All examples presented are representative and non-limiting. The above-described embodiments can be modified or varied, without departing from the presently disclosed subject matter, as appreciated by those skilled in the art in light of the above teachings. It is therefore to be understood that, within the scope of the claims and their equivalents, the presently disclosed subject matter can be practiced otherwise than as specifically described.

What is claimed is:

1. A method for the manufacture of carbon nanofibers comprising:
    (a) providing intermediate nanofibers stabilized by heating in an oxygen-containing atmosphere; and
    (b) pre-carbonization heating comprising providing stabilized intermediate nanofibers in an inert atmosphere, wherein said pre-carbonization heating comprises heating said inert atmosphere from at least about 150° C. to between about 400° C. and about 600° C. at a heating rate of up to about 2° C. per minute and holding at a pre-carbonization temperature between about 400° C. and about 600° C. for a sufficient time to increase the crosslinking of the nanofibers and/or to begin to remove non-carbon elements from the nanofibers.

2. The method of claim 1, further comprising carbonization heating between about 700° C. and about 2200° C., for a sufficient time to yield carbon nanofibers.

3. The method of claim 2, wherein said sufficient time for carbonization heating is at least about 30 minutes.

4. The method of claim 1, wherein said pre-carbonization temperature is between about 450° C. and about 550° C.

5. The method of claim 1, wherein said heating rate is up to about 0.5° C./min.

6. The method of claim 5, wherein said heating rate is up to about 0.1° C./min.

7. The method of claim 6, wherein said heating rate is up to 0.05° C./min.

8. The method of claim 1, wherein said sufficient time to increase the crosslinking of said nanofibers and/or to begin to remove non-carbon elements from said nanofibers is at least about 30 minutes.

9. The method of claim 1, wherein said intermediate nanofibers are prepared by electrospinning a mixture comprising alkali lignin and a polymer.

10. The method of claim 9, wherein said electrospinning is solution electrospinning.

11. The method claim 10, wherein said mixture further comprises water and said polymer is soluble in said mixture.

12. The method of claim 11, wherein said polymer is poly (vinyl alcohol).

13. A method for preparing carbon nanofibers comprising:
    (a) electrospinning a mixture comprising alkali lignin and a polymer to provide electrospun alkali lignin/polymer nanofibers;
    (b) providing said electrospun alkali lignin/polymer nanofibers in an oxygen-containing atmosphere and heating the oxygen-containing atmosphere to a first stabilization temperature of at least about 100° C. at a heating rate of no more than 2.0° C. per minute;
    (c) heating from said first stabilization temperature to a second stabilization temperature of at least about 160° C. at a heating rate of no more than about 1.0° C. per minute;
    (d) heating from said second stabilization temperature to a third stabilization temperature of at least about 180° C. at a heating rate of no more than about 1.0° C. per minute; and (e) heating from said third stabilization temperature to a fourth stabilization temperature of at least about 200° C. at a heating rate of no more than about 1.0° C. per minute;

wherein said stabilization heating yields stabilized nanofibers.

14. The method of claim 13, wherein said mixture further comprises water and said polymer is soluble in said mixture.

15. The method of claim 14, wherein said polymer is poly(vinyl alcohol).

16. The method of claim 13, further comprising providing said stabilized nanofibers in an inert atmosphere and heating the inert atmosphere to a pre-carbonization temperature of at least about 400° C. at a heating rate of no more than about 0.5° C. per minute to yield pre-carbonized nanofibers.

17. The method of claim 16, wherein said nanofibers
in (c) are held at said second stabilization temperature for at least about 8 hours;
in (d) are held at said third stabilization temperature for at least about 12 hours; and
in (e) are held at said fourth stabilization temperature for at least about 2 hours.

18. A method for preparing carbon nanofibers comprising
(a) electrospinning a mixture of alkali lignin and a polymer;
(b) heat treating said electrospun alkali lignin/polymer nanofibers wherein said heat treating comprises providing said nanofibers in an oxygen-containing atmosphere and progressive stabilization heating of said oxygen-containing atmosphere from a first stabilization temperature of at least about 100° C. to an final stabilization temperature of at least about 200° C. at a heating rate of no more than 1° C. per minute to yield stabilized nanofibers;
(c) providing said stabilized nanofibers in an inert atmosphere and heating the inert atmosphere up to a pre-carbonization temperature of at least about 400° C. at a heating rate of no more than about 0.2° C. per minute and holding at said pre-carbonization temperature for a sufficient time to increase crosslinking in said nanofibers to yield pre-carbonized nanofibers; and
(d) providing said pre-carbonized nanofibers in an inert atmosphere and heating the inert atmosphere up to a carbonization temperature of at least about 700° C. at a heating rate of no more than about 10° C. per minute and holding at said carbonization temperature for a sufficient time to remove most of the non-carbon impurities in said nanofibers.

19. The method of claim 18, wherein said rate of heating in (b) is between about 0.05° C./min and about 1° C./min; said rate of heating in (c) is no more than about 0.1° C./min and said pre-carbonization temperature is held for at least about 30 minutes; and said carbonization temperature is held for at least about 30 minutes.

20. The method claim 19, wherein said polymer is soluble in an aqueous solvent.

21. The method of claim 20, wherein said mixture comprises water and said polymer is poly(vinyl alcohol).

22. The method of claim 21, wherein said mixture of poly(vinyl alcohol) and alkali lignin contains at least about 50 wt % alkali lignin.

23. The method of claim 22, wherein said mixture of poly(vinyl alcohol) and said alkali lignin contains at least about 70 wt % alkali lignin.

24. Carbon nanofibers having a surface area of from about 250 $m^2/g$ to about 750 $m^2/g$ and a peak pore volume greater than about 0.04 $cm^3/nm/g$ for pores having a diameter of less than about 5 nm and an average pore size of no more than about 4 nm.

25. A electric double layer capacitor comprising the carbon nanofiber of claim 24.

* * * * *